US010940800B2

(12) United States Patent
Imamura et al.

(10) Patent No.: US 10,940,800 B2
(45) Date of Patent: Mar. 9, 2021

(54) DISPLAY SYSTEM, ELECTRONIC MIRROR SYSTEM, AND MOVING VEHICLE

(71) Applicant: PANASONIC INTELLECTUAL PROPERTY MANAGEMENT CO., LTD., Osaka (JP)

(72) Inventors: Norihiro Imamura, Osaka (JP); Michihiro Yamagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 43 days.

(21) Appl. No.: 16/552,586

(22) Filed: Aug. 27, 2019

(65) Prior Publication Data
US 2020/0070729 A1    Mar. 5, 2020

(30) Foreign Application Priority Data

Aug. 30, 2018 (JP) .............................. JP2018-162122
Apr. 8, 2019  (JP) .............................. JP2019-073828

(51) Int. Cl.
  *G02B 5/30* (2006.01)
  *B60R 1/07* (2006.01)
  (Continued)

(52) U.S. Cl.
  CPC ................ *B60R 1/07* (2013.01); *B60R 1/083* (2013.01); *G02B 5/3025* (2013.01);
  (Continued)

(58) Field of Classification Search
  CPC ... B60R 1/07; B60R 1/083; B60R 2001/1215; B60R 2300/20; G02B 5/3025; G02B 5/3083
  (Continued)

(56) References Cited

U.S. PATENT DOCUMENTS 5,764,411 A * 6/1998 Shanks .................. G02B 30/56
                                                            359/485.02
9,823,472 B2 * 11/2017 Kim .................... G02B 27/0101
                    (Continued)

FOREIGN PATENT DOCUMENTS

JP    2-204714    8/1990
JP    07-309152    11/1995
          (Continued)

OTHER PUBLICATIONS

Office Action issued in German patent application No. 10 2019 121 409.2 dated Jul. 22, 2020, along with English language translation thereof.

(Continued)

*Primary Examiner* — Ricky D Shafer
(74) *Attorney, Agent, or Firm* — Greenblum & Bernstein, P.L.C.

(57) ABSTRACT

A display system according to the present disclosure includes at least a first reflective surface and a second reflective surface on an optical path leading from a display device to a last reflective surface. The first reflective surface reflects a light beam emerging from the display device toward the second reflective surface. The second reflective surface reflects, toward the last reflective surface, the light beam reflected from the first reflective surface. The light beam emerging from the display device travels along a first optical path leading from a display screen of the display device to the first reflective surface and then travels along a second optical path leading from the second reflective surface to the last reflective surface. The first optical path and the second optical path intersect with each other before the light beam impinges on the last reflective surface.

18 Claims, 16 Drawing Sheets

(51) Int. Cl.
*B60R 1/08* (2006.01)
*B60R 11/02* (2006.01)
*B60R 1/12* (2006.01)

(52) U.S. Cl.
CPC ........ *G02B 5/3083* (2013.01); *B60R 11/0235* (2013.01); *B60R 2001/1215* (2013.01); *B60R 2300/20* (2013.01)

(58) Field of Classification Search
USPC .............................. 359/487.02, 489.07, 630
See application file for complete search history.

(56) References Cited

U.S. PATENT DOCUMENTS

| | | | | |
|---|---|---|---|---|
| 10,031,368 | B2* | 7/2018 | Otani | G02B 5/3025 |
| 10,120,188 | B2* | 11/2018 | Matsuzaki | G02B 27/123 |
| 10,222,614 | B2* | 3/2019 | Kuzuhara | G02B 27/0101 |
| 10,495,877 | B2* | 12/2019 | Kuzuhara | B60K 35/00 |
| 10,525,886 | B2* | 1/2020 | Imamura | B60K 35/00 |
| 10,656,415 | B2* | 5/2020 | Kuzuhara | B60K 37/04 |
| 10,775,619 | B2* | 9/2020 | Miyamoto | B60K 35/00 |
| 2011/0317015 | A1 | 12/2011 | Seto et al. | |
| 2016/0195727 | A1* | 7/2016 | Kuzuhara | H04N 5/74 359/633 |
| 2017/0192234 | A1* | 7/2017 | Lai | G02B 27/0101 |
| 2017/0248786 | A1 | 8/2017 | Kuzuhara et al. | |
| 2017/0269428 | A1 | 9/2017 | Otani et al. | |
| 2018/0015876 | A1* | 1/2018 | Yamagata | B60Q 3/12 |
| 2018/0345860 | A1 | 12/2018 | Imamura et al. | |
| 2019/0299858 | A1* | 10/2019 | Imamura | H04N 13/383 |

FOREIGN PATENT DOCUMENTS

| | | |
|---|---|---|
| JP | 2008-296635 | 12/2008 |
| JP | 2009-120080 | 6/2009 |
| JP | 2014-130269 | 7/2014 |
| JP | 2016-122059 | 7/2016 |
| JP | 2017-210229 | 11/2017 |
| JP | 2018-036336 | 3/2018 |
| WO | 2010/050012 | 5/2010 |
| WO | 2016/079927 | 5/2016 |
| WO | 2016/147570 | 9/2016 |

OTHER PUBLICATIONS

English translation of Office Action for Japanese Patent Application No. 2019-073828 dated Jan. 7, 2020.

Office Action in JP2019-073828 dated Dec. 24, 2019, along with English language translation.

Office Action in JP2019-073828 dated Mar. 9, 2020, along with English language translation.

* cited by examiner

Virtual Image   300A

Virtual Image   300B

DISPLAY SYSTEM, ELECTRONIC MIRROR SYSTEM, AND MOVING VEHICLE

CROSS-REFERENCE TO RELATED APPLICATION

This application claims the benefit of foreign priority to Japanese Patent Application No. 2018-162122 filed on Aug. 30, 2018 and Japanese Patent Application No. 2019-73828 filed on Apr. 8, 2019, both of which are assigned to the assignee of the present application.

TECHNICAL FIELD

The present disclosure generally relates to a display system, an electronic mirror system, and a moving vehicle, and more particularly relates to a display system, an electronic mirror system, and a moving vehicle, all of which are configured to display an image.

BACKGROUND ART

A display device (display system) for vehicles has been known which includes a rear camera, a monitor, and a concave mirror. See, for example, JP 2009-120080 A (hereinafter referred to as D1). The rear camera captures an image to offer a rear view of the vehicle. The monitor is provided on a roof between a driver's seat and an assistant driver's seat in the vehicle cabin to produce, based on the image data provided by the rear camera, an image offering a rear view of the vehicle. The concave mirror is arranged at the top of the windshield in the vehicle cabin to reflect the image produced on the monitor such that the reflected image offering the rear view of the vehicle is eventually incident on the eyes of the driver in the vehicle.

In the display device for vehicles of D1, to decrease the shift of focus of the vehicle driver between when he or she is watching the situation in front of the vehicle and when he or she is viewing the image produced on the concave mirror, the viewing distance between the driver's viewpoint and a point where the image appears to be formed to his or her eyes needs to be increased. For this purpose, the distance from the monitor to the concave mirror needs to be increased, which would cause an increase in the overall size of the display device for vehicles, thus leaving narrower room in the vehicle cabin. That is why there has been an increasing demand for reducing the overall size of the display device for vehicles.

SUMMARY

The present disclosure provides a display system, an electronic mirror system, and a moving vehicle, all of which contribute to downsizing.

A display system according to an aspect of the present disclosure is configured to display, based on a first image produced on a display device, a second image thereon. The display system includes a first reflective surface and a second reflective surface on an optical path leading from the display device to a last reflective surface. The last reflective surface is configured to reflect a light beam emerging from the display device toward a space outside of the display system. The first reflective surface is configured to reflect the light beam emerging from the display device toward the second reflective surface. The second reflective surface is configured to reflect, toward the last reflective surface, the light beam reflected from the first reflective surface. The light beam emerging from the display device travels along a first optical path and then a second optical path. The first optical path leads from a display screen of the display device to the first reflective surface. The second optical path leads from the second reflective surface to the last reflective surface. The first optical path and the second optical path intersect with each other before the light beam impinges on the last reflective surface.

A display system according to another aspect of the present disclosure is configured to display, based on a first image produced on a display device, a second image thereon. The display system includes: the display device; a first optical member; a second optical member; and a last optical member. The first optical member is arranged to face the display device and has a first reflective surface configured to reflect a first incoming light beam that has come in a first direction from a display screen of the display device toward a second direction different from, and not parallel to, the first direction. The second optical member is arranged to face the first reflective surface and has a second reflective surface configured to reflect a second incoming light beam that has come in the second direction from the first reflective surface toward a third direction different from the second direction. The last optical member is arranged to face the second reflective surface and has a last reflective surface configured to reflect a third incoming light beam that has come in the third direction from the second reflective surface. An optical path of the first incoming light beam intersects with an optical path of the third incoming light beam.

An electronic mirror system according to still another aspect of the present disclosure includes: the display system described above; and an image capture device. The display device is configured to display the first image based on an image captured by the image capture device.

A moving vehicle according to still another aspect of the present disclosure includes: the electronic mirror system described above; and a moving vehicle body equipped with the electronic mirror system.

BRIEF DESCRIPTION OF DRAWINGS

The figures depict one or more implementations in accordance with the present teachings, by way of example only, not by way of limitations. In the figures, like reference numerals refer to the same or similar elements.

DESCRIPTION OF EMBODIMENTS

Note that FIGS. 1-16 to be referred to in the following description of embodiments are just schematic representations, and therefore, the dimensions, thicknesses, and other parameters of the respective elements on those drawings are not always illustrated to scale, compared with actual ones.

Embodiments (1) Overview

Figure 1:
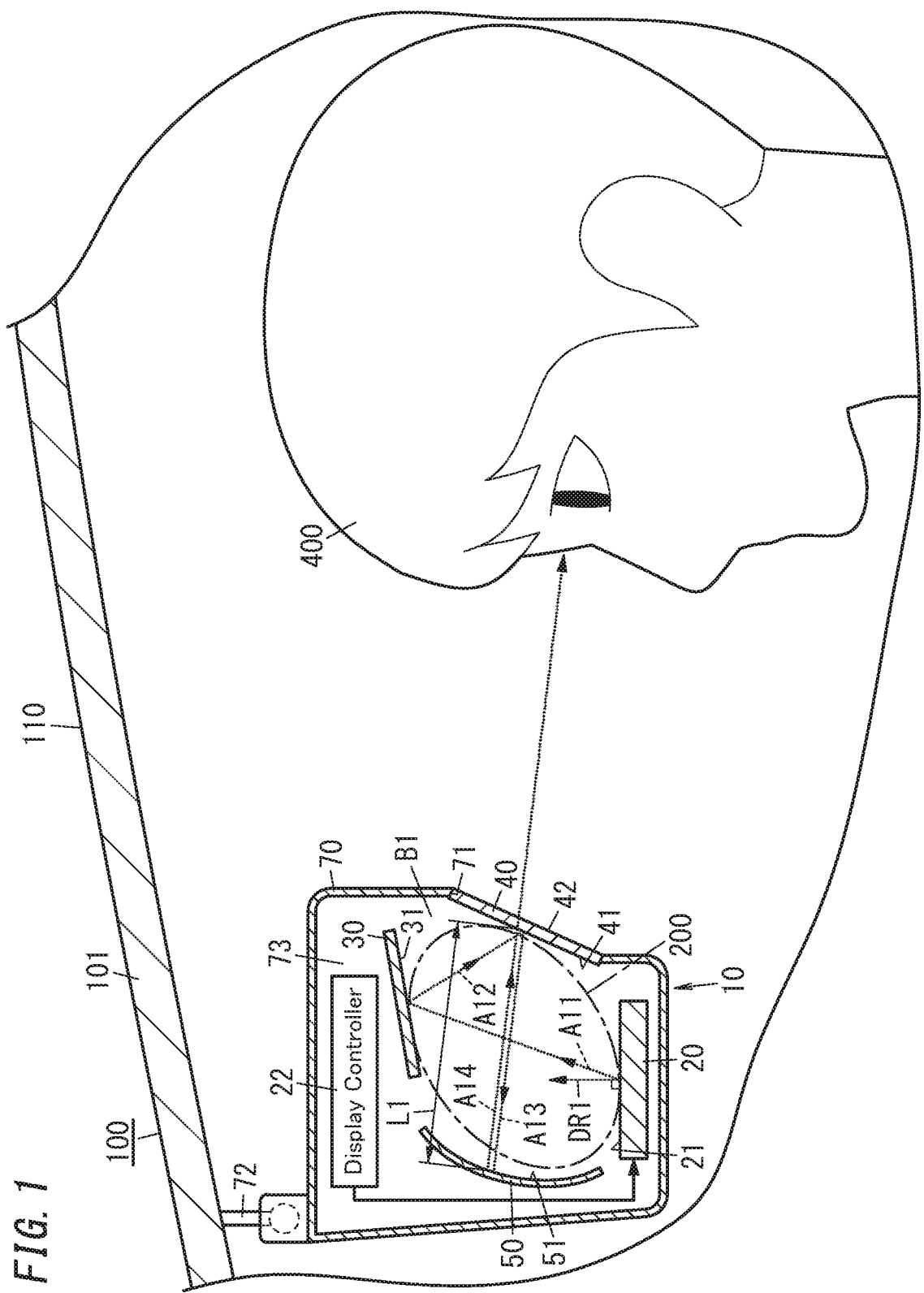
FIG. 1 schematically illustrates a display system according to an exemplary embodiment of the present disclosure.
Figure 2:
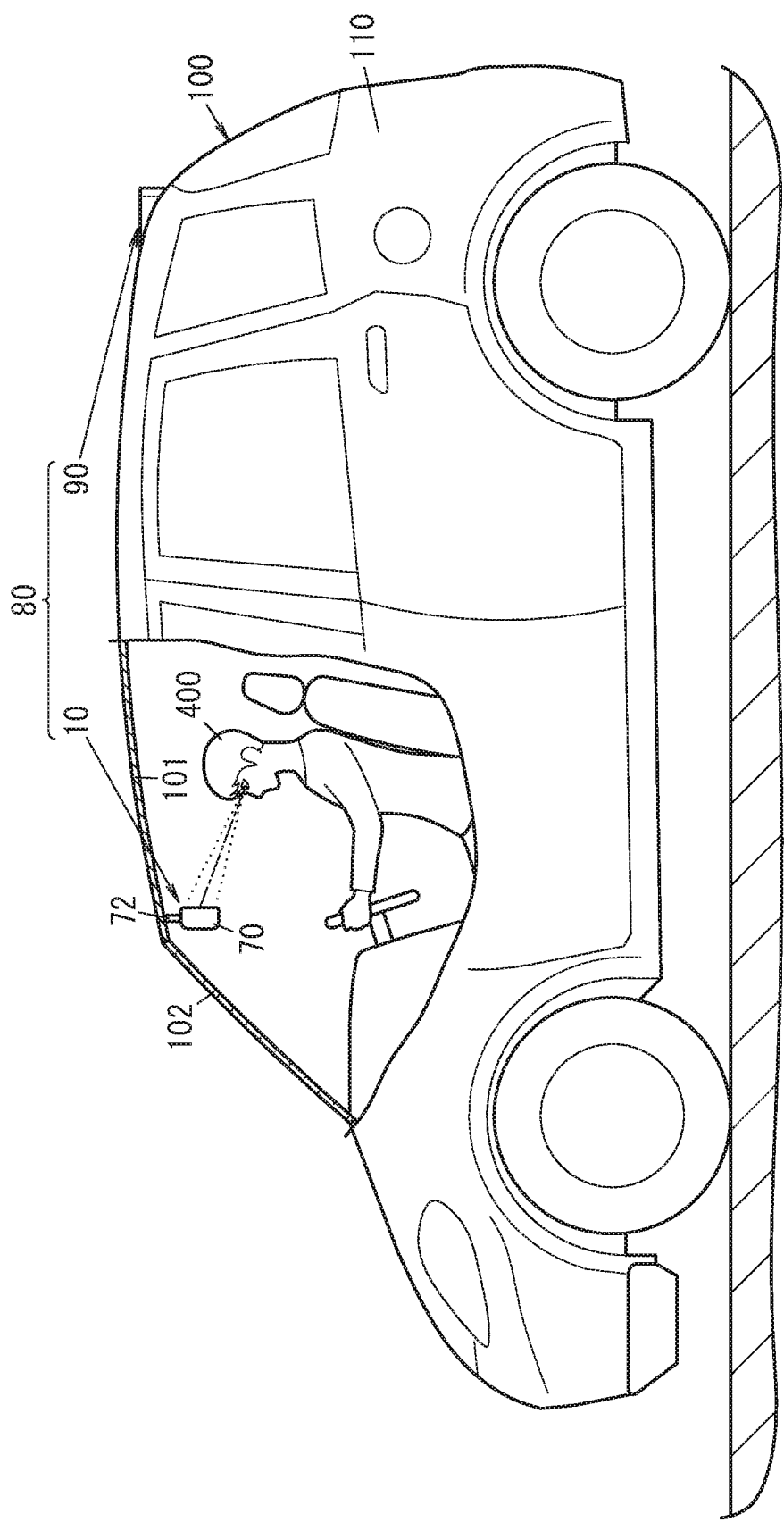
FIG. 2 is a schematic representation depicting a moving vehicle equipped with the display system.

A display system 10 according to an exemplary embodiment may be used, for example, in an automobile 100 as an exemplary moving vehicle as shown in FIGS. 1 and 2.

The display system 10 includes a display device 20 a first reflective surface 31, a second reflective surface 41, and a last reflective surface 51 as shown in FIG. 1.

The display system 10 includes at least the first reflective surface 31 and the second reflective surface 41 on an optical path leading from the display device 20 to the last reflective surface 51 to reflect a light beam emerging from the display device 20 toward a space outside of the display system 10. Note that the display system 10 has a reflection optical system including these reflective surfaces 31, 41, 51 and the last reflective surface 51 reflects the light beam emerging from the display device 20 for the last time in the reflection optical system.

The first reflective surface 31 reflects the light beam emerging from the display device 20 toward the second reflective surface 41. The second reflective surface 41 reflects, toward the last reflective surface 51, the light beam reflected from the first reflective surface 31.

The light beam emerging from the display device 20 travels along an optical path A11 and then an optical path A13. The optical path A11 leads from a display screen 21 of the display device 20 to the first reflective surface 31. The optical path A13 leads from the second reflective surface 41 to the last reflective surface 51. The optical path A11 and the optical path A13 intersect with each other before the light beam impinges on the last reflective surface 51.

In other words, the display system 10 includes the display device 20, a first optical member (which may be a first reflective mirror 30 in this embodiment), a second optical member (which may be a second reflective mirror 40 in this embodiment), and a last optical member (which may be last reflective mirror 50 in this embodiment). The first optical member is arranged to face the display device 20. The first optical member has the first reflective surface 31 that reflects a first incoming light beam (such as a light beam traveling along the optical path A11 shown in FIG. 1) that has come in a first direction from the display screen 21 of the display device 20 toward a second direction different from, and not parallel to, the first direction. The second optical member is arranged to face the first reflective surface 31. The second optical member has the second reflective surface 41 that reflects a second incoming light beam (such as a light beam traveling along the optical path A12 shown in FIG. 1) that has come in the second direction from the first reflective surface 31 toward a third direction different from the second direction. The last optical member is arranged to face the second reflective surface 41. The last optical member has the last reflective surface 51 that reflects a third incoming light beam (such as a light beam traveling along the optical path A13 shown in FIG. 1) that has come in the third direction from the second reflective surface 41. The optical path A11 of the first incoming light beam intersects with the optical path A13 of the third incoming light beam. As used herein, if two surfaces or members face each other, the two surfaces may naturally be arranged exactly parallel to each other but may also be not parallel to each other, i.e., one may be arranged tilted with respect to the other.

In this embodiment, the display device 20, the first reflective surface 31, the second reflective surface 41, and the last reflective surface 51 are arranged to surround a range 200 in which a light propagation medium is present. As used herein, the range 200 in which the medium is present refers to a range filled with the light propagation medium, and may be either a space or the inside of an optical member such as a prism made of a light transmitting material such as glass. Also, as used herein, if the first reflective surface 31 reflects the light beam emerging from the display device 20 toward the second reflective surface 41, then the light beam reflected from the first reflective surface 31 may be incident on the second reflective surface 41 either directly or indirectly via one or a plurality of reflective surfaces. Also, as used herein, if the second reflective surface 41 reflects the light beam reflected from the first reflective surface 31 toward the last reflective surface 51, then the light beam reflected from the second reflective surface 41 may be incident on the last reflective surface 51 either directly or indirectly via one or a plurality of reflective surfaces. Furthermore, as used herein, if the optical paths A11 and A13 intersect with each other, the optical path of the light beam emerging from the display screen 21 of the display device 20 does not entirely intersect with the optical path of the light beam reflected from the second reflective surface 41. That is to say, the optical path A11 of at least part of the light beam emerging from the display device 20 (such as the light beam emerging from around the center of the display screen 21 thereof) needs to intersect with the optical path A13 of the light beam reflected from the second reflective surface 41. In other words, if the optical path A11 and A13 intersect with each other, then the optical path of at least part of the light beam emerging from the display screen 21 of the display device 20 needs to intersect with the optical path of the light beam reflected from the second reflective surface 41 when viewed perpendicularly to a plane including both the direction parallel to the optical path A11 and the direction parallel to the optical path A13.

In FIG. 1, the optical paths A11-A14 along which the light beam emerging from around the center of the display screen 21 of the display device 20 is reflected from the last reflective surface 51 to go out of the display device 20 are indicated by the dotted lines. Note that the lines and curves indicating the range 200 through which the light beam travels, the optical paths A11-A14 of the light beam passing through the range 200, and an interval L1 are shown in FIG. 1 for illustrative purposes only and are not actually present in the real world.

In this embodiment, before the light beam emerging from the display device 20 impinges on the last reflective surface 51, the optical path A11 along which the light beam emerging from the display screen 21 of the display device 20 travels toward the first reflective surface 31 intersects with the optical path A13 along which the light beam travels from the second reflective surface 41 toward the last reflective surface 51. The optical paths A11 and A13 intersect with each other in this manner. Thus, supposing that the light beam is reflected the same number of times as in a situation where the light beam travels along the circumference of the range 200, the total length of the optical path leading from the display device 20 to the last reflective surface 51 increases. This allows the interval L1 between the second reflective surface 41 and the last reflective surface 51 to be decreased with the total length of the optical path leading from the display device 20 to the last reflective surface 51 increased, thus cutting down the overall size of the display system 10. This reduces the overall size of the display system 10 while increasing the viewing distance from the viewpoint of the user 400 of the display system 10 to an image (virtual image) displayed on the last reflective surface 51.

In the following description of embodiments, the first optical member, the second optical member, and the last optical member are supposed to be separate optical members. However, this is only an example and should not be construed as limiting. Alternatively, part or all of the first optical member, the second optical member, and the last optical member may be integrated together. Also, the first optical member, the second optical member, and the last optical member are configured in this embodiment as reflective mirrors, but may also be configured as prisms. That is to say, the first reflective surface 31, the second reflective surface 41, and the last reflective surface 51 may be reflective surfaces of prisms, and two or all three of the first reflective surface 31, the second reflective surface 41, and the last reflective surface 51 may be a plurality of reflective surfaces of a single prism.

(2) Details

Next, a display system 10 according to an exemplary embodiment will be described in detail with reference to the accompanying drawings.

(2.1) Configuration

As shown in FIG. 1, the display system 10 according to this embodiment includes the display device 20, the first reflective mirror 30 with the first reflective surface 31, the second reflective mirror 40 with the second reflective surface 41, and the last reflective mirror 50 with the last reflective surface 51. The display system 10 further includes a display controller 22 and a housing 70.

The display system 10 according to this embodiment and an image capture device 90 (see FIG. 2) together form an electronic mirror system 80. The display device 20 displays a first image based on an image captured by the image capture device 90. The electronic mirror system 80 is mounted on a moving vehicle body 110 of an automobile 100 as an exemplary moving vehicle. That is to say, the moving vehicle (automobile 100) includes the electronic mirror system 80 and the moving vehicle body 110 to be equipped with the electronic mirror system 80.

The housing 70 may be a molded product of a synthetic resin, for example. The housing 70 may be formed in the shape of a rectangular parallelepiped with an internal chamber 73. The housing 70 is formed in such a shape that when mounted on the moving vehicle body 110, its dimension measured in the rightward/leftward direction (i.e., along the width of the vehicle) is smaller than its dimension measured in the upward/downward direction or its dimension measured in the forward/backward direction with respect to the moving vehicle body 110. In the chamber 73 of the housing 70, housed are the display device 20, the first reflective mirror 30, the second reflective mirror 40, the last reflective mirror 50, and the display controller 22.

The housing 70 is installed on a front portion, located close to a windshield 102, of the roof 101 of the moving vehicle body 110 so as to come into sight of the user 400 who is seated on the driver's seat 103 (see FIG. 2). The housing 70 is mounted on the roof 101 of the moving vehicle body 110 via a supporting member 72 such as a ball joint so as to be suspended from the roof 101 and not to obstruct the user's 400 front sight. In the example illustrated in FIGS. 1 and 2, the supporting member is arranged in an upper part of the housing 70 and suspended from the roof 101. However, this is only an example and should not be construed as limiting. Alternatively, the supporting member may also be arranged in a rear part (i.e., a part closer to the front end of the vehicle) of the housing 70 to mount the housing 70 onto the windshield 102.

The housing 70 has an opening 71 on the back surface thereof (i.e., on the rear wall of the housing 70) such that the opening 71 runs through the rear wall of the housing 70. The opening 71 is larger in dimension in the rightward/leftward direction (i.e., in the direction perpendicular to the upward/downward direction and the forward/backward direction) than in the upward/downward direction. The ratio of its dimension in the rightward/leftward direction (i.e., the longer-side dimension) to its dimension in the upward/downward direction (i.e., the shorter-side dimension) may fall within the range from approximately 3-6 to 1.

The display device 20 is housed in a lower part of the chamber 73 with the display screen 21 facing upward. The display device 20 lets a light beam, forming a first image, emerge from itself. The display device 20 includes a light source and a liquid crystal display (LCD) panel, for example. The LCD panel is arranged in front of the light source. The light source is used as a backlight for the LCD panel. The light source is a so-called "surface-emitting light source." The light source is a side-lighting light source that uses a solid-state light-emitting element such as a light-emitting diode or a laser diode. The light beam emitted from the light source is transmitted through the LCD panel and then emerges from the display screen 21 of the display device 20. The first image is formed by the light beam emerging from the display screen 21 of the display device 20. In this case, the angle of emergence of the light beam emerging from the display screen 21 of the display device 20 may be determined by adjusting the angle of emission of the light beam emitted from the light source, for example.

The display system 10 according to this embodiment includes a reflection optical system B1 made up of the three mirrors, namely, the first reflective mirror 30 with the first reflective surface 31, the second reflective mirror 40 with the second reflective surface 41, and the last reflective mirror 50 with the last reflective surface 51. In this embodiment, the display device 20, the first reflective mirror 30, the second reflective mirror 40, and the last reflective mirror 50 are arranged to surround the range 200 in which the medium is present inside the chamber 73.

The first reflective mirror 30 may be configured as a plane mirror, for example. The first reflective surface 31 of the first reflective mirror 30 may be formed by evaporating a reflective metal film of aluminum, for example, on the surface of glass. The first reflective mirror 30 is arranged in an upper part of the chamber 73 with the first reflective surface 31 facing down. That is to say, the display screen 21 of the display device 20 and the first reflective surface 31 face each other with the range 200 interposed between them. In this embodiment, the first reflective surface 31 of the first reflective mirror 30 has a flat surface. However, this is only an example and should not be construed as limiting. The first reflective surface 31 may also be a curved surface such as a free-form surface. Forming the first reflective surface 31 as a free-form surface allows the distortion of the second image produced on the last reflective surface 51 to be reduced, the curvature of the image plane to be reduced, and the resolution to be increased.

In this embodiment, the display device 20 and the first reflective mirror 30 are arranged such that the display screen 21 is generally parallel to the first reflective surface 31, thus reducing the dimension in the upward/downward direction of the housing 70. As used herein, if two surfaces are "parallel to each other," this phrase may naturally refer to a situation where the two surfaces never intersect with each other but may also refer to a situation where the two surfaces intersect with each other at an angle of a few degrees as long as the two surfaces look generally parallel to each other to the human eyes.

The second reflective mirror 40 has a light-transmitting property. The second reflective mirror 40 may be configured as a beam splitter in a flat plate shape, and the second reflective surface 41 is the surface of the beam splitter. That is to say, out of the first reflective surface 31 and the second reflective surface 41, at least one reflective surface with a light-transmitting property (e.g., the second reflective surface 41 in this embodiment) is the surface of the beam splitter. In other words, at least one of the first reflective surface 31 or the second reflective surface 41 is the surface of a light-transmitting optical member with a light-transmitting property that transmits the incoming light beam partially. The light beam reflected from the last reflective surface 51 is transmitted through the light-transmitting optical member to go out of the display system 10. In this embodiment, the second reflective mirror 40 is used as a light-transmitting optical member and may be configured as a beam splitter, for example. That is to say, the light-transmitting optical member includes a beam splitter.

The second reflective mirror 40 has the property of transmitting a part of the incoming light beam and reflecting another part of the incoming light beam. In this embodiment, the second reflective mirror 40 is provided by forming a half mirror, of which the optical transmittance and optical reflectance are both approximately 50%, on the second reflective surface 41 (hereinafter also referred to as an "inner surface"). Note that the second reflective mirror 40 is configured as a beam splitter. The second reflective mirror 40 is attached to the opening 71 of the housing 70 and arranged to be adjacent to the display screen 21 of the display device 20 and the first reflective surface 31. In the second reflective mirror 40, the second reflective surface 41 facing the chamber 73 and an outer surface 42 facing the outside of the housing 70 are each a flat surface. In this case, the second reflective mirror 40 is arranged such that a normal to the second reflective surface 41 intersects obliquely with the direction in which the light beam reflected from the first reflective surface 31 is incident and the direction in which the light beam reflected from the last reflective surface 51 is incident. The direction in which the light beam reflected from the first reflective surface 31 is incident is parallel to the optical path A12 shown in FIG. 1 and the direction in which the light beam reflected from the last reflective surface 51 is incident is parallel to the optical path A14 shown in FIG. 1. In this embodiment, the second reflective surface 41 of the second reflective mirror 40 has a flat surface. However, this is only an example and should not be construed as limiting. The second reflective surface 41 may also be a curved surface such as a free-form surface. Forming the second reflective surface 41 as a free-form surface allows the distortion of the second image produced on the last reflective surface 51 to be reduced, the curvature of the image plane to be reduced, and the resolution to be increased.

The last reflective mirror 50 may be configured as a concave mirror, for example. The last reflective surface 51 of the last reflective mirror 50 may be formed by evaporating a reflective metal film of aluminum, for example, on the surface of glass. The last reflective mirror 50 is arranged inside of the chamber 73 so as to face the second reflective mirror 40 with the range 200 interposed between them. The last reflective mirror 50 is arranged in the chamber 73 with the last reflective surface 51 facing backward, and the last reflective surface 51 of the last reflective mirror 50 and the second reflective surface 41 of the second reflective mirror 40 face each other with the range 200 interposed between them. The last reflective surface 51 of the last reflective mirror 50 is arranged adjacent to the display screen 21 of the display device 20 and the first reflective surface 31. Note that the last reflective mirror 50 does not have to be a concave mirror but may also be a plane mirror, for example.

In this embodiment, the first reflective surface 31 reflects the light beam emerging from the display device 20 toward the second reflective surface 41. Then, the second reflective surface 41 further reflects, toward the last reflective surface 51, the light beam that has been once reflected from the first reflective surface 31. That is to say, the light beam emerging from the display device 20 is sequentially reflected from the first reflective surface 31 and the second reflective surface 41 and then incident on the last reflective surface 51.

The last reflective surface 51 further retro-reflects, back toward the second reflective surface 41, the light beam that has once been reflected from the second reflective surface 41. In this embodiment, the second reflective surface 41 is configured as the surface of a second optical member (such as a beam splitter) that transmits part of the incoming light beam. That is to say, the second optical member with the second reflective surface 41 has a light transmitting property of transmitting part of the incoming light bean and the second optical member serves as a light-transmitting optical member. As the last reflective surface 51 reflects the incoming light beam toward the second reflective surface 41, the light beam reflected from the last reflective surface 51 is transmitted through the second reflective surface 41 to go out of the display system 10. Thus, when the first image is displayed on the display device 20, the second image reflected from the last reflective surface 51 is transmitted through the second reflective mirror 40 (beam splitter) with the second reflective surface 41 so as to be viewed as a virtual image by the user 400 (who may be the driver of the automobile 100, for example). That is to say, the user 400 views the image that has been reflected from the first reflective surface 31, the second reflective surface 41, and the last reflective surface 51. Thus, to the user's 400 eyes, the first image produced on the display device 20 appears to be formed at a display position farther than the last reflective surface 51 (e.g., a few meters ahead of the user's 400 viewpoint) in the direction in which the user 400 views the last reflective surface 51 through the second reflective mirror 40. That is to say, to the user's 400 eyes, a virtual image that is a second image 300 based on the first image produced on the display device 20 appears to be actually present a few meters ahead of the automobile 100 (see FIG. 3).

The display controller 22 controls the display state of the first image produced by the display device 20. The display controller 22 communicates (either via a cable or wirelessly) with the image capture device 90 over an intra-vehicle network provided for the automobile 100. The display controller 22 is provided by the image capture device 90 with image data of a captured image representing a rear view of the automobile 100. The display controller 22 may have the first image, based on the captured image provided by the image capture device 90, displayed on the display device 20.

As used herein, the first image based on the captured image may be the captured image itself, an image obtained by subjecting the captured image to image processing, or a computer graphics (CG) image generated based on the captured image, whichever is appropriate. For example, an image captured at night by the image capture device 90 tends to be a darker one, and therefore, may be subjected to brightness correction. Also, a CG image or a marker indicating an obstacle shot in the image may be generated based on the image captured by the image capture device 90 and an image in which the CG image or marker is superimposed on the image captured by the image capture device 90 may be displayed on the display device 20. Alternatively, an image in which a marker indicating driver assistance information (such as vehicle velocity information, navigation information, pedestrian information, foregoing vehicle information, lane deviation information, and vehicle condition information) is superimposed on the image captured by the image capture device 90 may be displayed on the display device 20.

The display controller 22 is implemented as a computer system including the processor and the memory as principal hardware components. In other words, the computer system performs the functions of the display controller 22 by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" may include a microcontroller including at least one processor and at least one memory. Therefore, the microcontroller may also be made up of a single or a plurality of electronic circuits including a semiconductor integrated circuit (IC) or a largescale integrated circuit (LSI).

The image capture device 90 may be, for example, a complementary metal-oxide semiconductor (CMOS) image sensor mounted on a rear portion of the automobile 100 to capture an image representing a rear view of the automobile 100. The image capture device 90 does not have to be a CMOS image sensor but may be any other type of image sensor such as a charge coupled device (CCD) image sensor as well.

The image capture device 90 outputs the image data, obtained by capturing an image representing a rear view of the automobile 100, to the display controller 22 over the intra-vehicle network. The image capture device 90 is arranged around a middle in the rightward/leftward direction of the rear portion of the automobile 100 to capture an image falling within a viewable range by a conventional rearview mirror. The electronic mirror system 80 may be used as a known rear view mirror. Optionally, the image capture device 90 may also capture an image representing a rear side view of the automobile 100. Still alternatively, the image capture device 90 may also capture an image falling within a viewable range by a conventional door mirror or fender mirror. That is to say, the electronic mirror system 80 may be used as a rearview mirror in place of the known door mirror or fender mirror. The image capture device 90 is mounted on the top rear portion of the moving vehicle body 110. However, this is only an example and should not be construed as limiting. Alternatively, the image capture device 90 may also be mounted at any other appropriate position from which an image may be captured in a desired range.

In the display system 10 according to this embodiment, the first image displayed by the display device 20, i.e., the light beam emerging from the display device 20 (light beam forming the first image), is reflected a number of times (e.g., three times in this embodiment) from the first reflective surface 31, the second reflective surface 41, and the last reflective surface 51. In this embodiment, the distance (viewing distance) to the position where the image (virtual image) viewable for the user 400 is displayed is determined by the length of the optical path leading from the display screen 21 of the display device 20 to the last reflective surface 51, and the focal length of an optical system formed by the first reflective surface 31, the second reflective surface 41, and the last reflective surface 51. Thus, having the light beam emerging from the display device 20 reflected a number of times allows the volume of the housing 70 (chamber 73), represented by the interval L1 between the second reflective surface 41 and the last reflective surface 51, to be reduced with the viewing distance to the image display position maintained at a desired distance. This reduces the overall size of the housing 70 in the direction in which the user 400 views the image on the last reflective surface 51 through the second reflective mirror 40, thus providing a display system 10 that contributes to size reduction.

(2.2) Operation

Next, it will be described how the display system 10 according to this embodiment and the electronic mirror system 80 including the display system 10 operate.

For example, when receiving a control signal, instructing the electronic mirror system 80 to start operating, from an electronic control unit (ECU) of the automobile 100 while receiving power supplied from a battery of the automobile 100, the electronic mirror system 80 starts operating.

For example, when receiving a control signal from the ECU of the automobile 100, the display controller 22 makes the image capture device 90 to capture an image representing a rear view of the automobile 100 at a predetermined frame rate, thus acquiring the image data of the image captured from the image capture device 90.

On receiving the image data of the captured image from the image capture device 90, the display controller 22 generates a first image based on the captured image and has the first image displayed on the display device 20.

When the first image is displayed on the display screen 21 of the display device 20, the light forming the first image travels in the direction parallel to the optical path A11 toward the first reflective surface 31. The first reflective surface 31 reflects, toward the second reflective surface 41, the incoming light beam that has come from the display device 20. The second reflective mirror 40 having the second reflective surface 41 is a beam splitter. The second reflective surface 41 reflects part of the incoming light beam from the first reflective surface 31 toward the last reflective surface 51. The last reflective surface 51 is a concave mirror, which reflects, toward the second reflective surface 41, a light beam forming a second image by magnifying the first image displayed by the display device 20. When the light beam reflected from the last reflective surface 51 is incident on the second reflective surface 41, part of the light beam reflected from the last reflective surface 51 is transmitted through the last reflective mirror 50 to leave the housing 70. This allows the user 400 to view the second image magnified by the last reflective surface 51.

In this embodiment, the display device 20, the first reflective surface 31, the second reflective surface 41, and the last reflective surface 51 are arranged to surround the range 200, the display device 20 and the first reflective surface 31 face each other with the range 200 interposed between them, and the second reflective surface 41 and the last reflective surface 51 face each other with the range 200 interposed between them. In addition, on the optical path along which the light beam emerging from the display screen 21 of the display device 20 travels to reach the last reflective surface 51, the optical path A11 of the light beam emerging from the display device 20 intersects with the optical path A13 of the light beam reflected from the second reflective surface 41. Furthermore, the second reflective surface 41 and the last reflective surface 51 are arranged such that the optical path A13 of the light beam traveling from the second reflective surface 41 to the last reflective surface 51 and the optical path A14 of the light beam traveling from the last reflective surface 51 toward the second reflective surface 41 become substantially parallel to each other. As used herein, if these optical paths A13 and A14 are parallel to each other, these optical paths A13 and A14 need to be substantially parallel to each other when viewed perpendicularly to a plane including these optical paths A13 and A14. Thus, these optical paths A13 and A14 may intersect with each other to form an angle of a few degrees between them.

In this embodiment, the optical path A11 is provided to intersect with the optical path A13. Thus, supposing the length of the optical path leading from the display screen 21 of the display device 20 to the last reflective surface 51 is the same, this reduces the overall size of the display system 10 along the length of the automobile 100.

Figure 3:
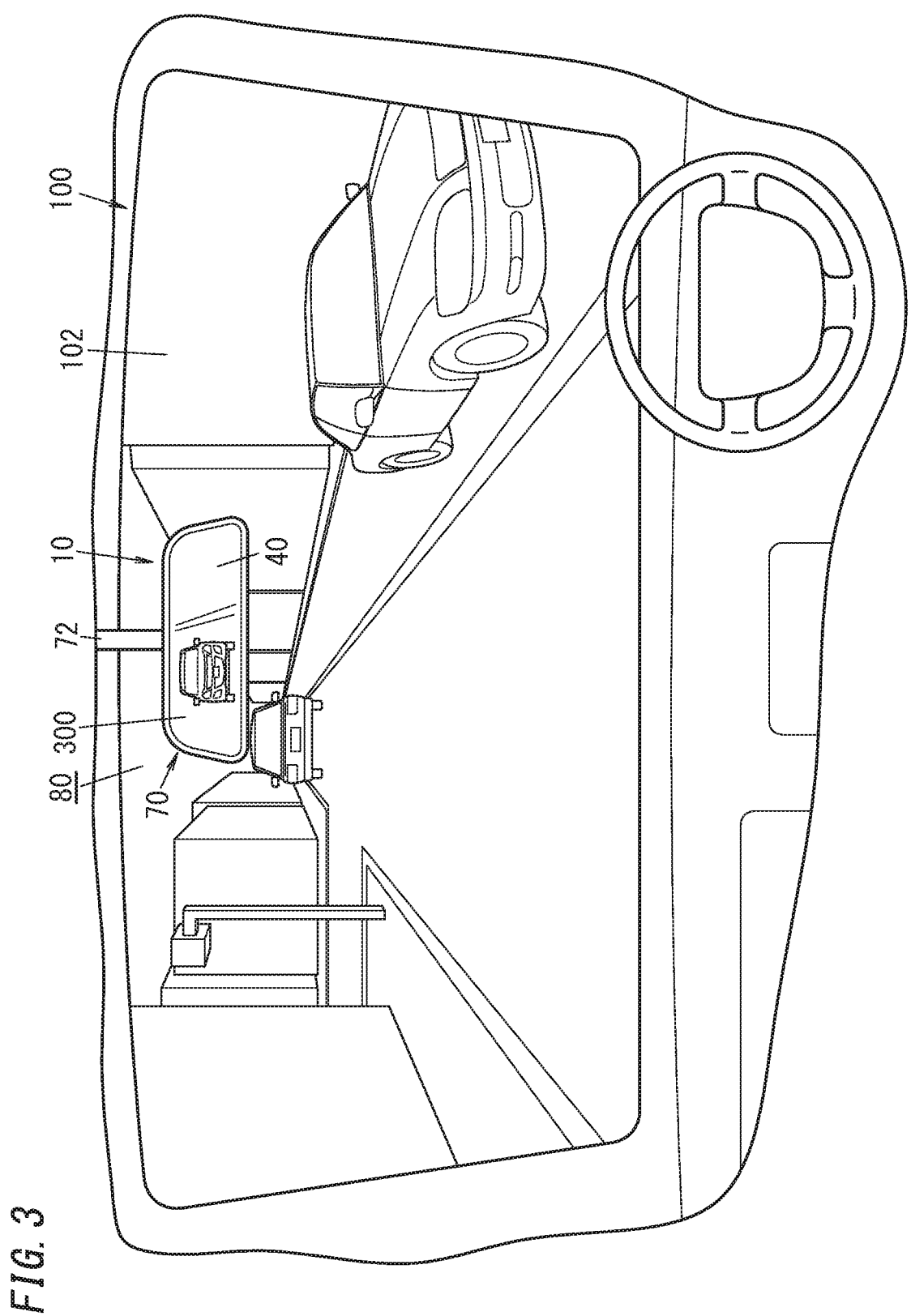
FIG. 3 depicts an example of an image displayed by the display system.

FIG. 3 illustrates an exemplary image displayed on the electronic mirror system 80. On an outer surface 42 of the second reflective mirror 40 configured as a beam splitter, a second image (virtual image) 300 based on the first image and produced by the light beam transmitted through the second reflective mirror 40 is displayed. The display system 10 displays the second image 300 that has been formed by having the first image on the display device 20 reflected from the first reflective surface 31, the second reflective surface 41, and the last reflective surface 51. Thus, to the user's 400 eyes, the second image 300 looks as if the second image 300 were present a few meters ahead of his or her viewpoint. Therefore, in a situation where the user 400 views the second image 300 while watching the situation in front of the automobile 100 through the windshield 102, the focal length needs to be adjusted much less significantly than when the display device 20 is arranged a few ten centimeters ahead of the user 400. This shortens the amount of time it takes for the user 400 to adjust the focus on the second image 300 displayed by the display system 10. In addition, this also facilitates the user's 400 adjusting the focus even if it is difficult for him or her to focus on a relatively short length due to old age or farsightedness.

In the embodiment described above, the light beam emerging from the display device 20 is reflected from the first reflective surface 31 and the second reflective surface 41, further reflected from the last reflective surface 51 toward the second reflective surface 41, and transmitted through the second reflective mirror 40 to go out of the housing 70 as shown in FIG. 1. To form such optical paths A11-A14, the display device 20 lets the light beam travel obliquely (i.e., along the optical path A11) with respect to a normal DR1 to the display screen 21 (see FIG. 1).

Figure 4:
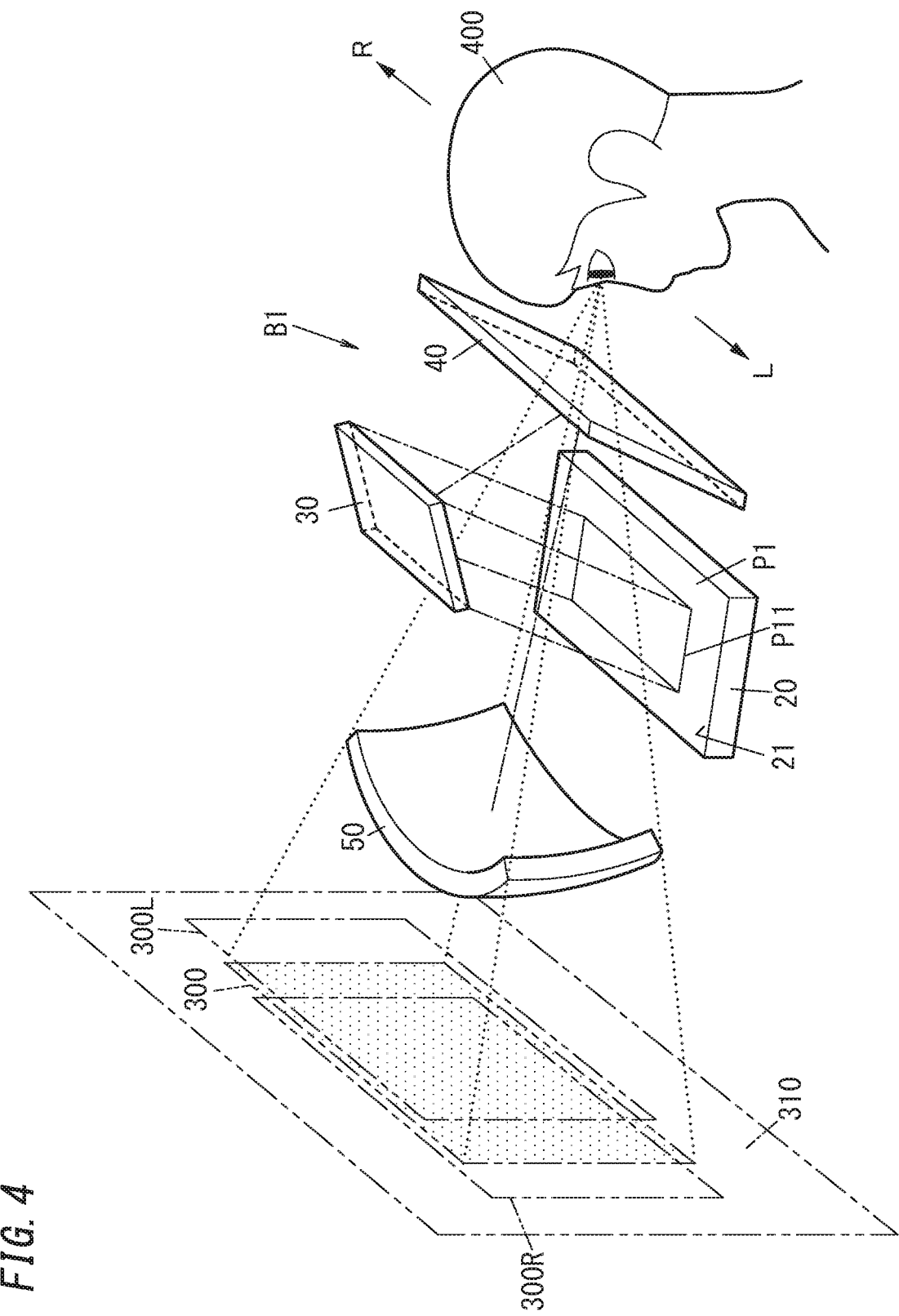
FIG. 4 illustrates a second image displayed by the display system.

In addition, in the embodiment described above, the second image 300 displayed by the display system 10 is based on a partial image P11 out of the first image P1 displayed on the display screen 21 of the display device 20 (see FIG. 4).

That is to say, in the display system 10 according to this embodiment, the reflection optical system B1 is formed by the first reflective mirror 30, the second reflective mirror 40, and the last reflective mirror 50, and the first reflective mirror 30 reflects the partial image P11 that forms part of the first image P1 produced on the display screen 21. Thus, the second image 300 formed by the light beam reflected from the reflection optical system B1 becomes a part of the virtual image 310 formed when the reflection optical system B1 reflects the first image B1 totally.

In this case, while the user 400 who is the driver of the automobile 100 is seated in position, the second image 300 to be viewed by the user 400 with his or her right and left eyes is located in the middle of the overall virtual image 310 in each of the upward/downward direction and the rightward/leftward direction. Meanwhile, as the user 400 turns his or her head to the right from the position shown in FIG. 4, the second image 300R to be viewed by the user 400 with his or her right and left eyes shifts to the left with respect to the second image 300 in the overall virtual image 310.

Furthermore, as the user 400 turns his or her head to the left from the position shown in FIG. 4, the second image 300L to be viewed by the user 400 with his or her right and left eyes shifts to the right with respect to the second image 300 in the overall virtual image 310.

As can be seen, according to this embodiment, as the user 400 turns his or her head to the left or to the right, the range of the second image 300 to be viewed by the user 400 shifts to the right or to the left in the overall virtual image 310. Likewise, as the user 400 turns his or her head upward or downward, the range of the second image 300 to be viewed by the user 400 shifts downward or upward in the overall virtual image 310. That is to say, as the user 400 turns his or her head upward, downward, rightward or leftward, the range of the second image 300 to be viewed by the user 400 varies with his or her head movement. Thus, the second image 300 displayed by the display system 10 looks like a mirror image.

(3) Variations

The exemplary embodiment described above is only one of various embodiments of the present disclosure, and may be readily modified, changed, replaced, or combined with any other embodiments, depending on a design choice or any other factor, without departing from a true spirit and scope of the present disclosure.

Next, variations of the exemplary embodiment will be enumerated one after another. Optionally, any of the variations to be described below may be adopted in combination as appropriate.

(3.1) First Variation

In a display system 10 according to a first variation, a second reflective surface 601 with a light-transmitting property is configured as the surface of a polarizer 60 as shown in FIGS. 5-8, which is a major difference from the exemplary embodiment described above. That is to say, in the display system 10 according to the first variation, one reflective surface with a light-transmitting property, which is either the first reflective surface 31 or the second reflective surface 601 (e.g., the second reflective surface 601 in this embodiment), is the surface of the polarizer 60. In addition, the display system 10 according to the first variation includes optical elements 61 and 62, producing a phase difference of a quarter wavelength in an electric field direction of incoming light, on the surface of the display screen 21 of the display device 20 and on the surface of the polarizer 60, respectively, which is another major difference from the exemplary embodiment described above. As used herein, "the optical elements 61 and 62 producing a phase difference in incoming light" refers to producing a phase difference of a quarter wavelength between the light incident on the optical element 61, 62 and the light transmitted through the optical element 61, 62 by causing either a phase lead or a phase lag to the light incident on the optical element 61, 62. Other than the polarizer 60 and the optical elements 61, 62, the display system 10 according to the first variation has the same configuration as the exemplary embodiment described above. Thus, in the following description, any constituent element of the first variation, having the same function as a counterpart of the exemplary embodiment described above, will be designated by the same reference numeral as that counterpart's, and a detailed description thereof will be omitted herein.

Figure 5:
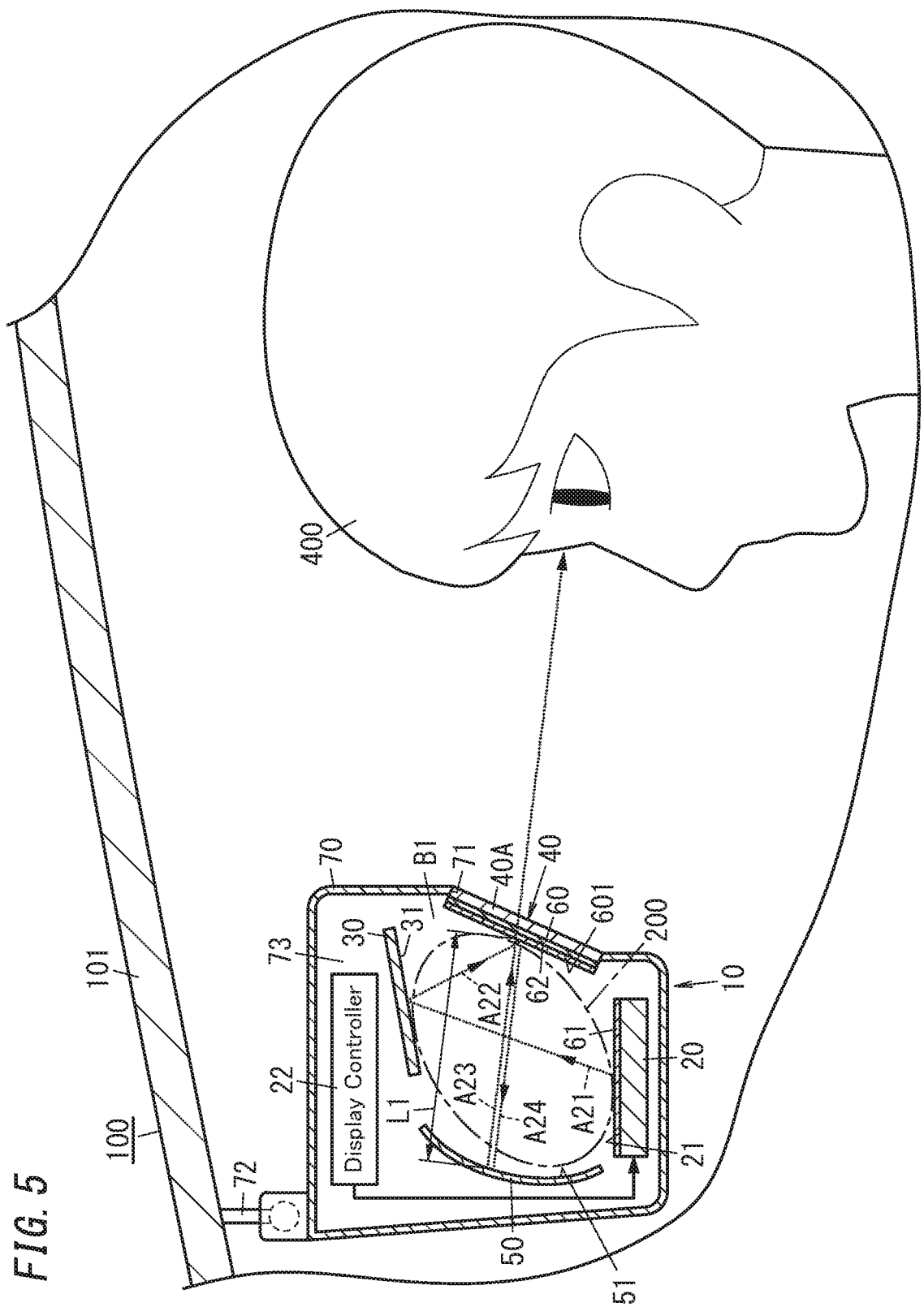
FIG. 5 schematically illustrates a display system according to a first variation of the exemplary embodiment of the present disclosure.

In FIG. 5, the optical paths A21-A24, along which the light beam emerging from around the center of the display screen 21 of the display device 20 is reflected from the last reflective surface 51 to go out of the display device 20, are indicated by the dotted lines. Note that the lines and curves indicating the range 200 through which the light beam travels, the optical paths A21-A24 of the light beam passing through the range 200, and an interval L1 are shown in FIG. 5 for illustrative purposes only and are not actually present in the real world.

The polarizer 60 may be configured as a wire-grid polarization plate, for example. The polarizer 60 may be a reflective polarization film provided on the surface of the substrate 40A (its surface facing the chamber 73) attached to the opening 71 of the housing 70. In other words, the light-transmitting optical member 40 with a light-transmitting property, which is a second optical member with the second reflective surface 601, includes the substrate 40A and the polarizer 60. More specifically, the light-transmitting optical member 40 includes the substrate 40A and the polarizer 60 provided on the surface of the substrate 40A. The substrate 40A is a transparent plate with a light-transmitting property and may be a glass pane or a plate of a synthetic resin (such as an acrylic resin or a polycarbonate resin). The polarizer 60 is a polarization plate in which a nanometer-scale fine wire grid is formed in a base member of a synthetic resin and is configured to polarize the incoming light by transmitting a light beam in a particular polarization state. For example, the polarizer 60 may be configured to transmit a P-polarized light beam and reflect an S-polarized light beam. Note that the polarizer 60 does not have to be a wire-grid polarization plate but may also be an optical element configured to polarize the incoming light beam by transmitting a light beam in a particular polarization state.

The display device 20 according to this embodiment may include a liquid crystal display (LCD), for example. The LCD includes a liquid crystal panel in which a liquid crystal layer is sandwiched between two polarization plates. Thus, the light beam C1 emerging from the display device 20 (see FIG. 6) comes to have a predetermined polarization state. In the following description of this first variation, the light beam C1 emerging from the display device 20 is supposed to be a P-polarized light beam. Also, in FIG. 6, the polarizer 60 and the optical element 62 are illustrated as being spaced apart from each other for illustrative purposes only. Actually, however, the polarizer 60 and the optical element 62 are arranged to be adhered to each other with a tackiness agent. That is to say, the polarizer 60 and the optical element 62 are stacked one on top of the other on the surface of the substrate 40A. Optionally, the substrate 40A and the polarizer 60 may also be arranged to be adhered to each other with a tackiness agent.

The optical elements 61 and 62 provided on the display screen 21 of the display device 20 and on the surface of the polarizer 60, respectively, are retardation plates made of a birefringent material in which the light travels at varying velocities according to the oscillation direction thereof. In this variation, the optical elements 61 and 62 are configured as quarter-wave plates that produce a phase difference of a quarter wavelength between a P-polarized component and an S-polarized component.

Figure 7:
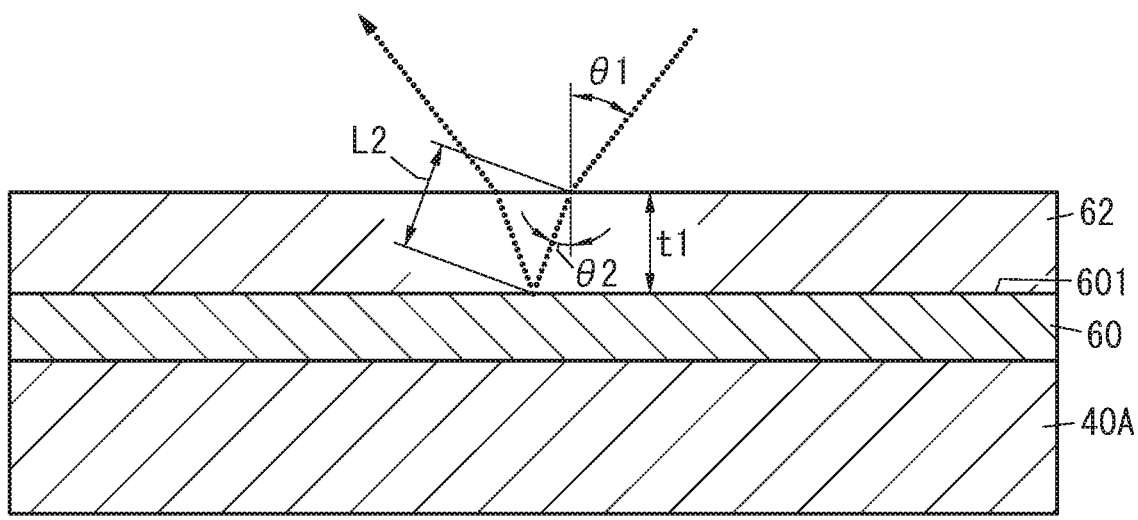
FIG. 7 illustrates a polarizer included in the display system according to the first variation.

FIG. 7 schematically illustrates how the optical element 62 provided on the surface of the polarizer 60 produces a phase difference in the incoming light. In FIG. 7, the optical path of the light beam incident on the surface of the optical element 62, reflected from the surface of the polarizer 60, and then goes out of the polarizer 60 through the surface of the optical element 62 is indicated by the dotted lines. The light beam incident on the surface of the optical element 62 at an angle of incidence θ1 is refracted by the surface of the optical element 62. In this case, if the angle of refraction is θ2, the thickness of the optical element 62 is t1, and the length of the optical path along which the light beam incident on the surface of the optical element 62 travels to reach the surface of the polarizer 60 (i.e., the second reflective surface 601) is L2, then the following Equation (1) is satisfied:

$$L2 \times \cos θ2 = t1 \qquad (1)$$

Therefore, if the thickness t1 and the angle of refraction θ2 are designed such that the phase difference produced by the optical path length L2 becomes equal to a quarter of the wavelength of the light beam incident on the optical element 62, then the optical element 62 is able to convert the polarization state of the incoming light beam from circular polarization into linear polarization. Also, if the optical element 61 has the same configuration as the optical element 62, the optical element 61 is also able to convert the polarization state of the incoming light beam from linear polarization into circular polarization.

Note that the optical element 62 suitably satisfies Equation (1). However, this is only an example and should not be construed as limiting. Alternatively, the optical element 62 may have such a property that produces a phase difference corresponding to a quarter of the wavelength of the incoming light beam when the angle of incidence θ1 is 0 degrees.

Also, the optical elements 61 and 62 suitably have a broadband characteristic that makes the phase difference close to a quarter of the wavelength of the incoming light beam in the entire visible radiation range. Using the optical elements 61 and 62 with such a broadband characteristic further increases the efficiency and reduces coloring of the video.

Furthermore, in this first variation, the polarizer 60 and the optical element 62 are provided with a tackiness agent in advance. However, this configuration is only an example and should not be construed as limiting. Alternatively, an adhesive with a lower viscosity than the tackiness agent may be used. This would reduce dispersion in the thickness of the optical element 62 itself, dispersion in the thickness of the tackiness agent layer between the substrate 40A and the polarizer 60, and dispersion in the thickness of the tackiness agent layer between the polarizer 60 and the optical element 62. Consequently, this would reduce the degree of fine waving of the respective interfaces between the substrate 40A, the polarizer 60, and the optical element 62, thus minimizing the degradation in the image quality of the reflected image. For example, a UV curable adhesive may be used as the adhesive.

Figure 8:
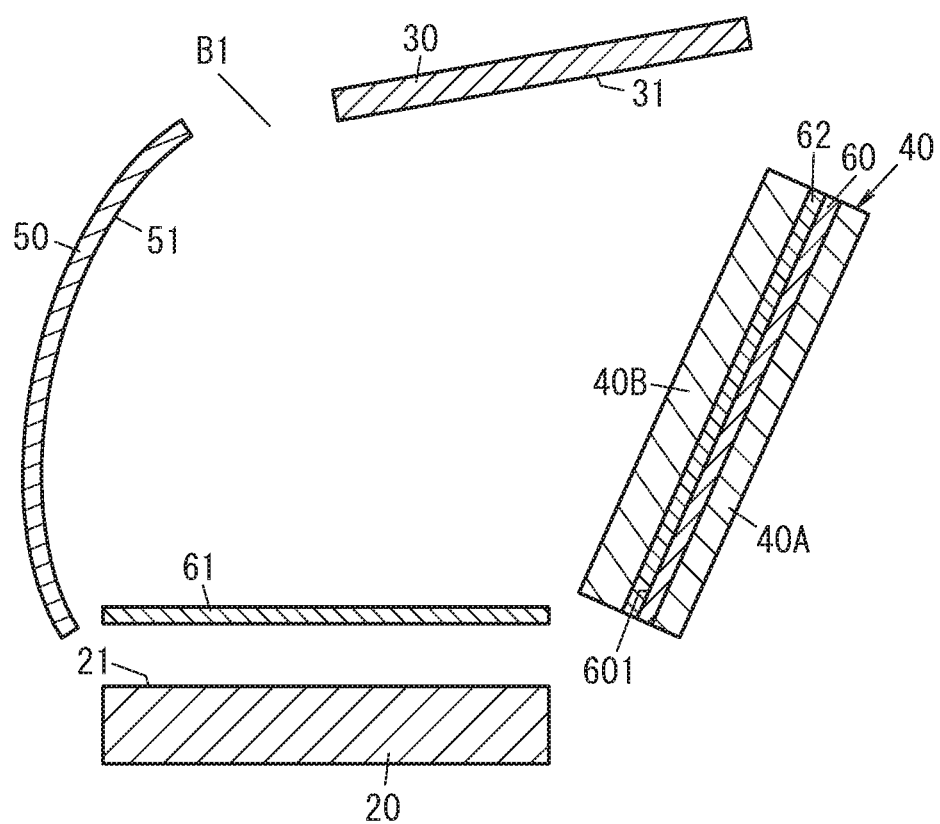
FIG. 8 schematically illustrates an alternative arrangement for the display system according to the first variation.

Furthermore, in the variation described above, the polarizer 60 and the optical element 62 are stacked one on top of the other on the surface of the substrate 40A. Optionally, a counter substrate with a light transmitting property may be arranged on the other surface, opposite from the surface facing the polarizer 60, of the optical element 62 provided on the surface of the polarizer 60. Specifically, as shown in FIG. 8, a counter substrate 40B is further stacked on the other surface, opposite from the surface facing the polarizer 60, of the optical element 62. In other words, the light-transmitting optical member 40 may be configured such that the polarizer 60 and the optical element 62 are sandwiched between these two substrates 40A and 40B. That is to say, the light-transmitting optical member 40 further includes a pair of light-transmitting substrates 40A and 40B that sandwiches the polarizer 60 and the optical element 62 provided on the surface of the polarizer 60. This would reduce dispersion in the thickness of the optical element 62 itself, dispersion in the thickness of the tackiness agent layer between the substrate 40A and the polarizer 60, and dispersion in the thickness of the tackiness agent layer between the polarizer 60 and the optical element 62. Consequently, this would reduce the degree of fine waving of the respective interfaces of the substrates 40A and 40B, the polarizer 60, and the optical element 62, thus minimizing the degradation in the image quality of the reflected image. Optionally, even in the sandwich structure shown in FIG. 8, the tackiness agent layer may also be replaced with an adhesive for bonding.

Figure 6:
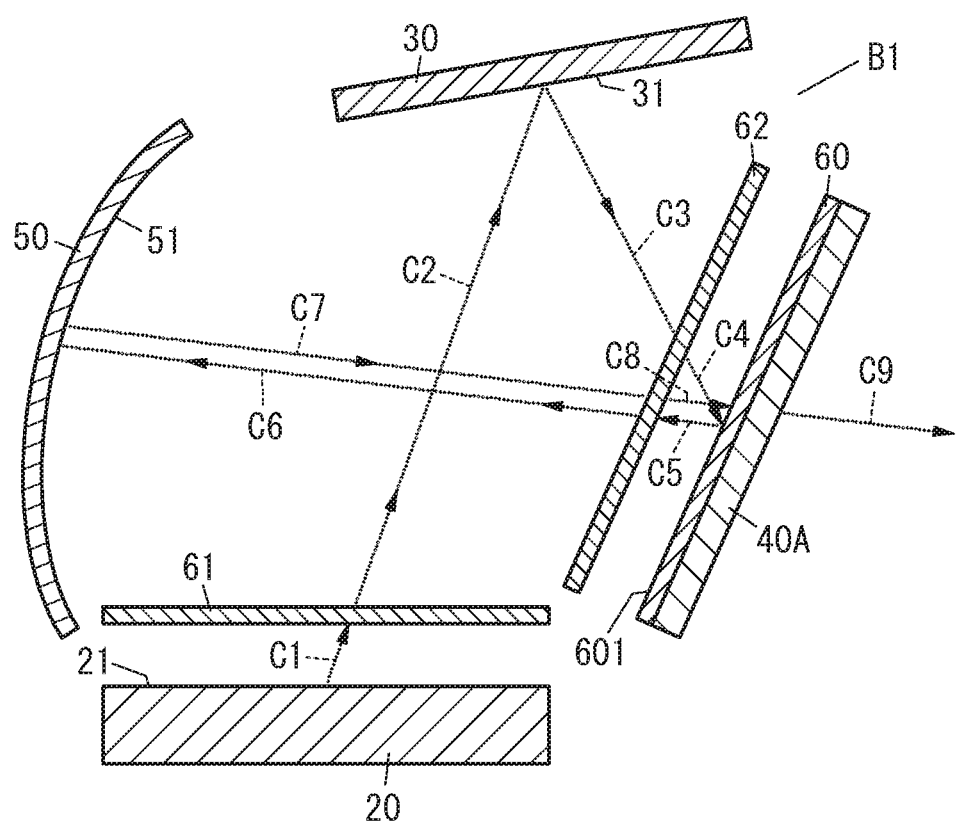
FIG. 6 schematically illustrates the display system according to the first variation.

Next, it will be described with reference to FIG. 6 where the light beam emerging from the display device 20 travels before going out of the display system 10. FIG. 6 is a schematic representation illustrating how the light beam is polarized by the optical elements 61 and 62. In FIG. 6, the display screen 21 of the display device 20 and the optical element 61 are illustrated as being separate from each other, and the polarizer 60 and the optical element 62 are illustrated as being separate from each other. Actually, in this variation, the optical element 61 is provided on the display screen 21 of the display device 20 and the optical element 62 is provided on the polarizer 60. Optionally, some gap may be left between the display screen 21 of the display device 20 and the optical element 61, and some gap may also be left between the polarizer 60 and the optical element 62.

For example, a P-polarized light beam C1 emerging from the display device 20 is transmitted through the optical element 61 to be converted into a circularly polarized light beam C2. Thus, the light beam C3 reflected from the first reflective surface 31 is also a circularly polarized light beam. The circularly polarized light beam C3 reflected from the first reflective surface 31 is then transmitted through the optical element 62 to be converted into an S-polarized light beam C4, which is incident on the second reflective surface 601 of the polarizer 60. The polarizer 60 transmits only the P-polarized light beam and reflects the S-polarized light beam. Thus, the light beam C4 incident on the second reflective surface 601 of the polarizer 60 is reflected from the second reflective surface 601 of the polarizer 60. Then, the light beam C5 reflected from the second reflective surface 601 of the polarizer 60 passes through the optical element 62 again to be converted into a circularly polarized light beam C6. After that, the circularly polarized light beam C6 is reflected from the last reflective surface 51 and incident on the optical element 62 again. The light beam C7 reflected from the last reflective surface 51 is a circularly polarized light beam C7, which is transmitted through the optical element 62 to be converted into a P-polarized light beam C8 and incident on the second reflective surface 601 of the polarizer 60. The polarizer 60 is configured to transmit only a P-polarized light beam. Thus, the P-polarized light beam C8 transmitted through the optical element 62 and incident on the second reflective surface 601 is transmitted through the polarizer 60 and passes through the substrate 40A to go out of the light-transmitting optical member 40. This allows the user 400 to view the second image 300 displayed on the last reflective surface 51 of the last reflective mirror 50 with the light beam C9 going out of the light-transmitting optical member 40 through the polarizer 60 and the substrate 40A.

In the first variation, the second optical member with the second reflective surface 601 is configured as a combination of the substrate 40A and the polarizer 60. In addition, since the second reflective surface 601 is defined by the surface of the polarizer 60, almost all of the light beam (S-polarized light beam) reflected from the first reflective surface 31 is able to be reflected toward the last reflective surface 51 and almost all of the light beam (P-polarized light beam)

reflected from the last reflective surface 51 is able to be transmitted. Thus, compared to the exemplary embodiment described above in which the second reflective surface is defined by the surface of the half mirror, this cuts down the loss of the light and increases the brightness of the second image 300 displayed by the display system 10. In addition, if the brightness of the second image 300 is as high as that of the exemplary embodiment described above in which the second reflective surface is defined by the surface of the half mirror, cutting down the loss of light allows the power consumption of the display device 20 to be reduced.

Figure 9:
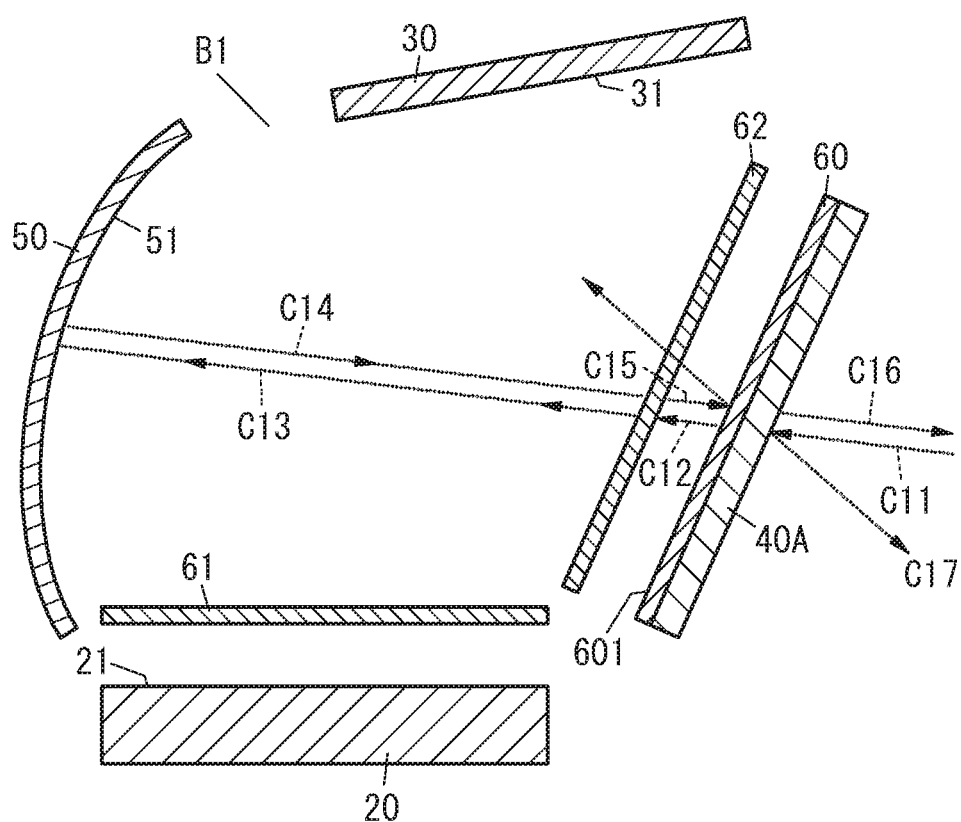
FIG. 9 illustrates the optical paths of an externally incoming light beam incident on the display system according to the first variation from outside of the display system.

Also, as shown in FIG. 9, when a non-polarized externally incoming light beam C11 (such as a light beam reflected from the user's 400 face or an interior member of the automobile 100, a light beam reflected from a structure outside of the vehicle cabin, or sunlight) comes in from the direction in which the user 400 who is looking at the display system 10 is located, the externally incoming light beam C11 is converted by the polarizer 60 into a P-polarized light beam C12. The light beam C12 is then converted by the optical element 62 into a circularly polarized light beam C13, which is reflected from the last reflective surface 51. Then, the light beam C14 reflected from the last reflective surface 51 is converted by the optical element 62 into an S-polarized light beam C15. However, since the polarizer 60 reflects the S-polarized light beam C15, the light beam C16 reflected from the last reflective mirror 50 and transmitted through the polarizer 60 toward the user 400 is cut down significantly. This significantly increases the contrast ratio of the second image 300 displayed by the display system 10. In addition, this also reduces the chances of a glaring light beam such as the sunlight or the light emitted from the following vehicle being reflected toward the user 400. Thus, this reduces the chances of the user 400 feeling glare. In this variation, the polarizer 60 is configured as a reflective polarization film, and therefore, there is almost no light reflected and returning to the user 400. Therefore, this cuts down the reflection of the externally incoming light beam compared to an evaporated half mirror that produces approximately 25% of returning light by reflection, thus further increasing the contrast ratio of the second image 300 displayed by the display system 10.

Even though the light beam C16 reflected toward the user 400 is significantly cut down, there are still chances of an intense light beam such as sunlight being condensed by the last reflective surface 51 serving as an concave mirror to go out toward the user 400. Thus, to reduce the chances of such a condensed light beam going toward the user 400, the display system 10 according to the first variation may attach a resin film with lower transmittance than the substrate 40A to the outer surface (i.e., the surface facing the user 400) of the substrate 40A. Alternatively, instead of attaching such a low-transmittance resin film to the substrate 40A, the substrate 40A itself may be made of glass with low transmittance such as smoked glass or a resin plate. Note that if such a resin film with lower transmittance than the substrate 40A is attached to the outer surface of the substrate 40A or if the transmittance of the substrate 40A itself is lowered, the second image 300 based on the first image displayed by the display device 20 becomes a darker one. Thus, in such a situation, the luminance of the display device 20 is suitably increased.

Optionally, the substrate 40A may be configured as a half mirror. While the display system 10 displays no images, providing an additional mechanism for changing the arrangement angle of the display system 10 allows the half-mirror substrate 40A to be used as a mirror.

(3.2) Second Variation

Figure 10:
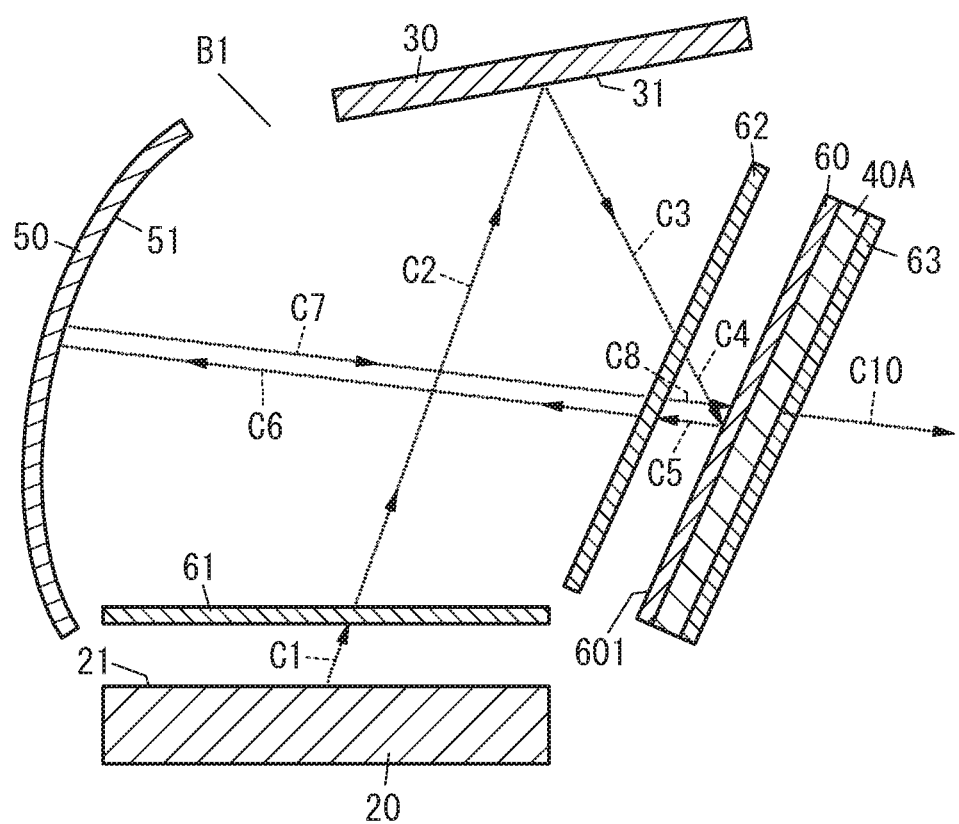
FIG. 10 schematically illustrates a display system according to a second variation of the exemplary embodiment of the present disclosure.

A display system 10 according to a second variation further includes a phase control member 63 as shown in FIG. 10, which is a major difference from the first variation described above. Other than the phase control member 63, the display system 10 according to the second variation has the same configuration as the exemplary embodiment or first variation described above. Thus, in the following description, any constituent element of the second variation, having the same function as a counterpart of the exemplary embodiment or first variation described above, will be designated by the same reference numeral as that counterpart's, and a detailed description thereof will be omitted herein.

In the display system 10 according to the second variation, the optical element 62 is arranged in front of the surface of the polarizer 60 on which the light beam coming from the display device 20 is incident. In addition, the phase control member 63 for producing a phase difference of a quarter wavelength in the electric field direction of the incoming light beam is arranged on the surface, facing outside of the display system 10, of the light-transmitting optical member (such as the substrate 40A).

As already described for the "(3.1) First variation" section, in the display system 10 according to the first variation, the light beam C8 transmitted through the optical element 62 and incident on the substrate 40A turns into a P-polarized light beam C8. Thus, letting the P-polarized light beam C8 pass through the phase control member 63 makes the light beam C10 going out of the display system 10 a circularly polarized light beam C10. This reduces the chances of the second image displayed by the display system 10 looking dark to even the user 400 who is wearing a pair of polarization glasses.

In the second variation, the phase control member 63 produces a phase difference of a quarter wavelength. However, this is only an example and should not be construed as limiting. Alternatively, the phase control member may also produce a phase difference not equal to a quarter wavelength (e.g., a phase difference of one-fifth wavelength to three-tenths wavelength). This reduces coloring of the image.

(3.3) Third Variation

Figure 11A:
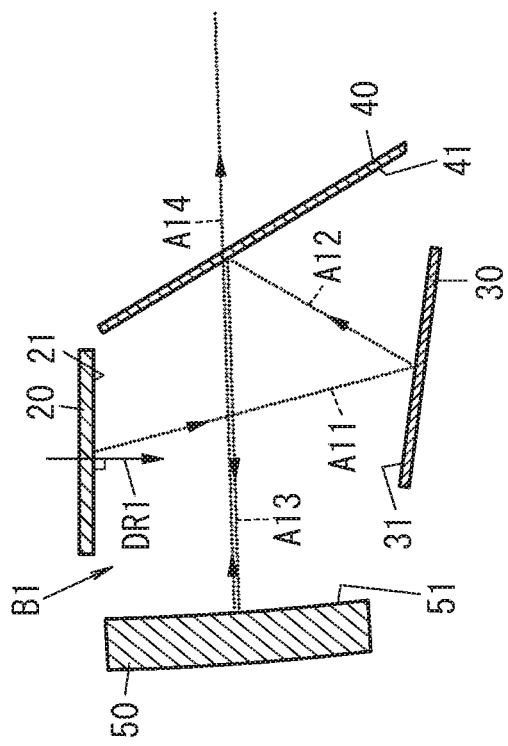
FIG. 11A schematically illustrates a display system according to a third variation of the exemplary embodiment of the present disclosure.

In the display system 10 according to the third variation, the last reflective surface 51 reflects the light beam that has come in one direction from the second reflective surface 41 toward another direction as shown in FIG. 11A, which is a major difference from the exemplary embodiment and first and second variations described above. Other than this feature that the last reflective surface 51 reflects the incoming light beam from the second reflective surface 41 in a different direction, this variation has the same configuration as the exemplary embodiment or first and second variations described above. Thus, in the following description, any constituent element of the third variation, having the same function as a counterpart of the exemplary embodiment or first and second variations described above, will be designated by the same reference numeral as that counterpart's, and a detailed description thereof will be omitted herein.

Figure 11B:
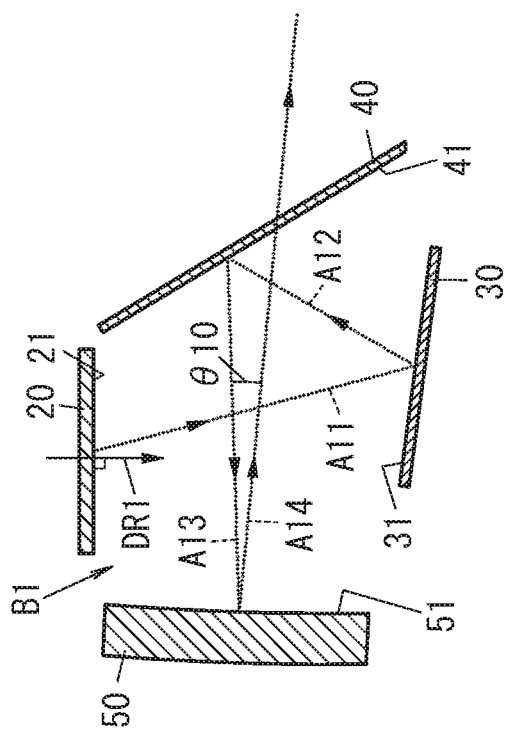
FIG. 11B schematically illustrates a display system according to the exemplary embodiment of the present disclosure.

FIG. 11B illustrates the arrangement of the reflection optical system B1 already described for the exemplary embodiment. In both of the reflection optical system B1 according to this third variation shown in FIG. 11A and the reflection optical system B1 according to the exemplary embodiment shown in FIG. 11B, the display device 20 has an angle of emergence of approximately 16 degrees, the first reflective surface 31 has an angle of reflection of approximately 22 degrees, and the second reflective surface 41 has an angle of reflection of approximately 30 degrees. In addition, in the reflection optical system B1 shown in FIG. 11B, the angle of reflection from the last reflective surface 51 is set at 0 degrees. On the other hand, in this variation, the angle of reflection from the last reflective surface 51 is set at about 4 degrees by adjusting only the orientation of the last reflective mirror 50. That is to say, in this variation, adjusting the orientation of the last reflective mirror 50 allows the last reflective surface 51 to reflect the incoming light beam from the second reflective surface 41 in a different direction.

Figure 12A:
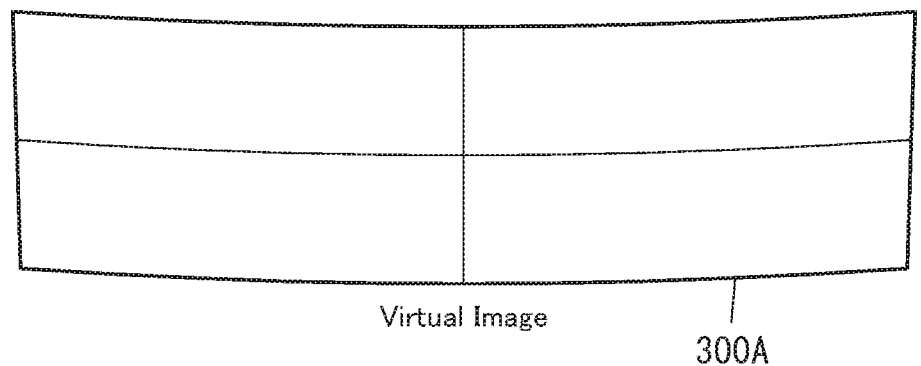
FIG. 12A illustrates a second image displayed by the display system according to the third variation.
Figure 12B:
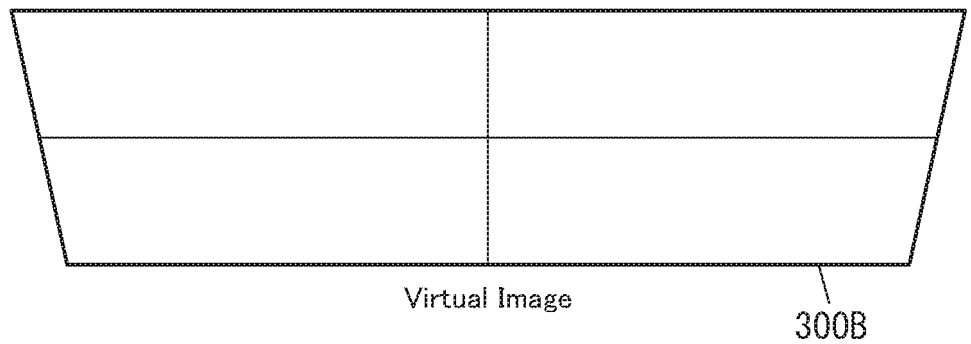
FIG. 12B illustrates a second image displayed by the display system according to the exemplary embodiment of the present disclosure.

If the last reflective surface 51 has an angle of reflection of 0 degrees in a situation where the light beam emerging from the display device 20 travels obliquely to a normal DR1 to the display screen 21 thereof, then the second image 300B displayed by the display system 10 comes to have trapezoidal distortion as shown in FIG. 12B. When the display system 10 is used as an electronic mirror system 80 for the automobile 100, conducting no distortion correction to the second image 300B would make objects (such as power poles or guard rails) displayed at right and left ends of the second image 300B so tilted that the user 400 could find such a second image 300B unnatural. Meanwhile, conducting distortion correction to the second image 300B would make a bottom portion of the second image 300B easily distorted.

Meanwhile, according to the third variation, the last reflective surface 51 reflects the incoming light beam in a different direction. Thus, the second image 300A displayed by the display system 10 becomes somewhat curved overall but has significantly reduced trapezoidal distortion as shown in FIG. 12A. Therefore, even conducting no distortion correction to the second image 300A would make the tilt of the objects displayed at the right and left ends of the second image 300A much less noticeable. In addition, even conducting distortion correction to the second image 300A would not make the second image 300A easily distorted.

(3.4) Fourth Variation

Figure 13:
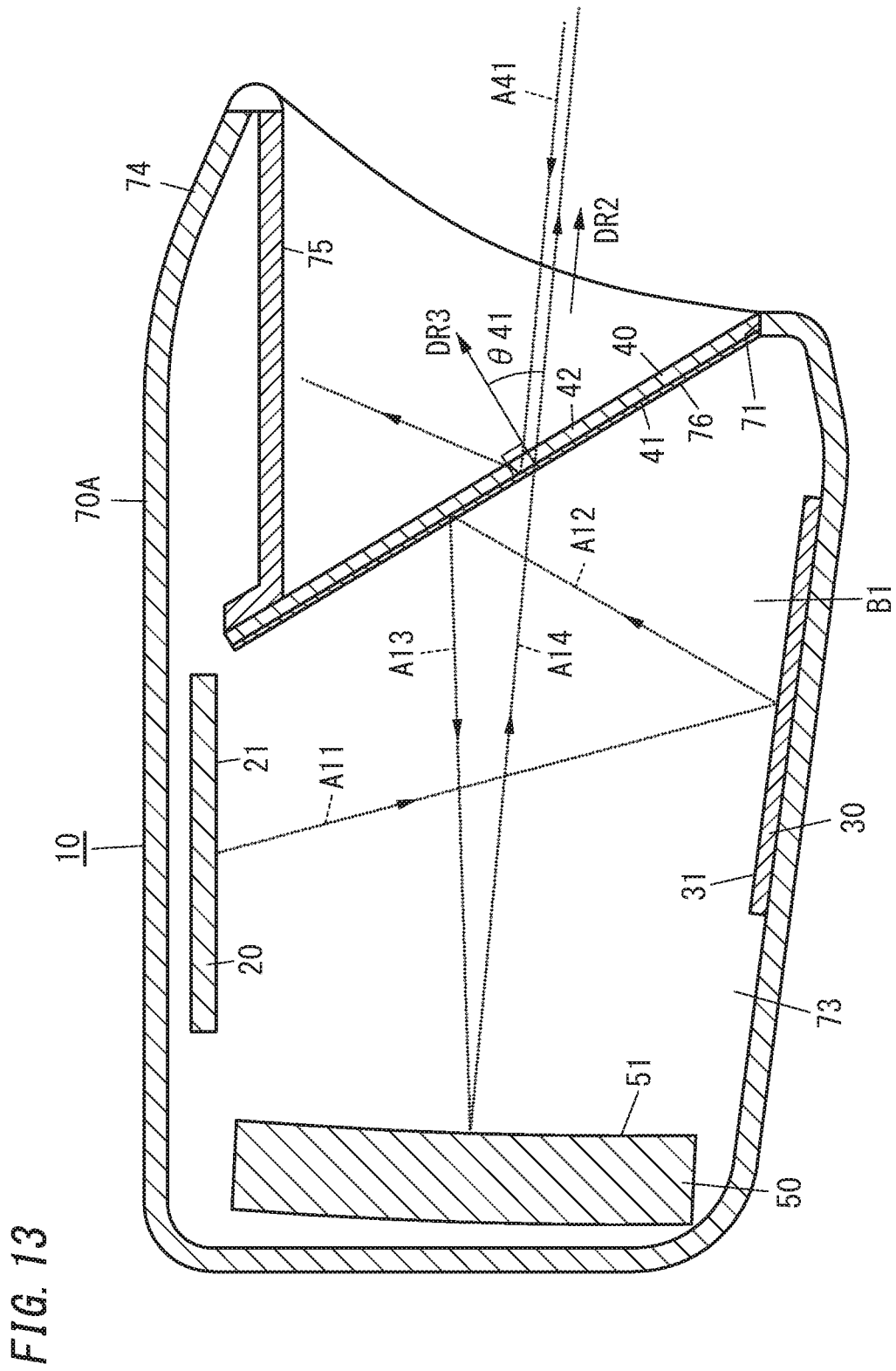
FIG. 13 schematically illustrates a display system according to a fourth variation of the exemplary embodiment of the present disclosure.

A display system 10 according to a fourth variation further includes a reflected glare reducer as shown in FIG. 13, which is a major difference from the exemplary embodiment described above. The reflected glare reducer is configured to reduce the reflected glare of an externally incoming light beam that has come from outside of the display system 10 (such as the light beam with the optical path A41 shown in FIG. 13) mainly on an inner surface (such as the second reflective surface 41) of the light-transmitting optical member (such as the second reflective mirror 40). In this fourth variation, the reflected glare reducer includes a half mirror 76 provided on the inner surface (the second reflective surface 41) of the light-transmitting optical member (the second reflective mirror 40) and a reflection reducing member 75. Other than the reflection reducing member, this fourth variation has the same configuration as the exemplary embodiment described above. Thus, in the following description, any constituent element of this fourth variation, having the same function as a counterpart of the exemplary embodiment described above, will be designated by the same reference numeral as that counterpart's, and a detailed description thereof will be omitted herein.

In this fourth variation, the half mirror 76 with an optical transmittance of 50% and an optical reflectance of 50% is formed on the inner surface of the second reflective mirror 40 serving as a light-transmitting optical member. In addition, the light-transmitting optical member (second reflective mirror 40) has a flat surface. This allows the half mirror 76 to be formed accurately and uniformly on the inner surface of the second reflective mirror 40. As used herein, the inner surface (second reflective surface 41) of the second reflective mirror 40 (light transmitting member) refers to a surface facing the inside of the housing 70A, out of both surfaces of the second reflective mirror 40 in the direction in which the light beam reflected internally in the housing 70A is transmitted through the second reflective mirror 40. The second reflective mirror 40 is arranged so as to obliquely intersect with the direction in which the light beam reflected from the last reflective surface 51 travels (i.e., a direction parallel to the one indicated by the arrow DR2 in FIG. 13). That is to say, the second reflective mirror 40 is arranged such that the direction in which the light beam reflected from the last reflective surface 51 travels and the normal DR3 to the inner surface of the second reflective mirror 40 intersect with each other to form a predetermined angle θ41 smaller than 90 degrees. This reduces, when the inner surface of the second reflective mirror 40 is viewed from the direction in which the image is output, the reflected glare of the light beam on the inner surface (second reflective surface 41). This increases the contrast ratio of the second image 300 viewed through the inner surface. That is to say, according to this variation, the reflected glare reducer includes the second reflective mirror (light-transmitting optical member) 40 arranged obliquely to the direction in which the light beam reflected from the last reflective surface 51 goes out of the housing 70A.

In addition, the display system 10 according to the fourth variation further includes a protruding portion 74 protruding backward from an upper portion of the housing 70A. The reflection reducing member 75 is arranged under this protruding portion 74. That is to say, the reflection reducing member 75 is arranged in a part, facing an outer surface 42 of the second reflective mirror 40, of the protruding portion 74.

The reflection reducing member 75 is arranged in the direction in which the light beam incident on the inner surface of the second reflective mirror 40 (i.e., the light beam of which the optical path is indicated by the arrow A41 in FIG. 13) from outside of the housing 70 along the optical path of the outgoing light beam (i.e., the direction indicated by the arrow DR2 in FIG. 13) and antiparallel to the traveling direction of the outgoing light beam is reflected from the inner surface (second reflective surface 41) of the second reflective mirror 40. The reflection reducing member 75 faces the second reflective mirror 40 serving as a light-transmitting optical member. In this variation, most of the reflection reducing member 75 has a flat plate shape and the dimension in the rightward/leftward direction of the reflection reducing member 75 is equal to or greater than that of the second reflective mirror 40. The reflection reducing member 75 has the capability of absorbing the incident light. The reflection reducing member 75 is darker in color (e.g., in black) than the inner surface of the roof 101 of the moving vehicle body 110 (see FIG. 2). Also, the reflection reducing member 75 has the capability of absorbing the incoming light beam in this variation, but may also have the capability of scattering the incoming light beam.

As can be seen from the foregoing description, according to this variation, the reflected glare reducer includes the reflection reducing member 75 arranged in the direction in which the light beam incident on the inner surface of the second reflective mirror 40 (light-transmitting optical member) from outside of the display system 10 along the optical path of the outgoing light beam reflected from the last reflective surface 51 is reflected from the inner surface, and facing the outer surface 42 of the second reflective mirror 40 (light-transmitting optical member). The reflection reducing member 75 absorbs and/or scatters the incoming light beam. This reduces the amount of the light beam incident on the second reflective mirror 40 from the region where the reflection reducing member 75 is arranged, thus reducing the reflected glare of the light beam on the inner surface of the second reflective mirror 40. This increases the contrast ratio of the second image 300 formed by the light beam transmitted through the second reflective mirror 40, thus making the second image 300 displayed by the display system 10 viewable more easily.

In the fourth variation described above, the reflected glare reducer includes both the half mirror 76 formed on the light-transmitting optical member and the reflection reducing member 75. However, this is only an example and should not be construed as limiting. Alternatively, the reflected glare reducer may include only one of the half mirror 76 or the reflection reducing member 75. Still alternatively, the protruding portion 74 may be replaced with a piece of cloth having the light absorbing or scattering capability which corresponds to the reflection reducing member 75 and which is provided on the roof 101.

(3.5) Fifth Variation

Figure 14:
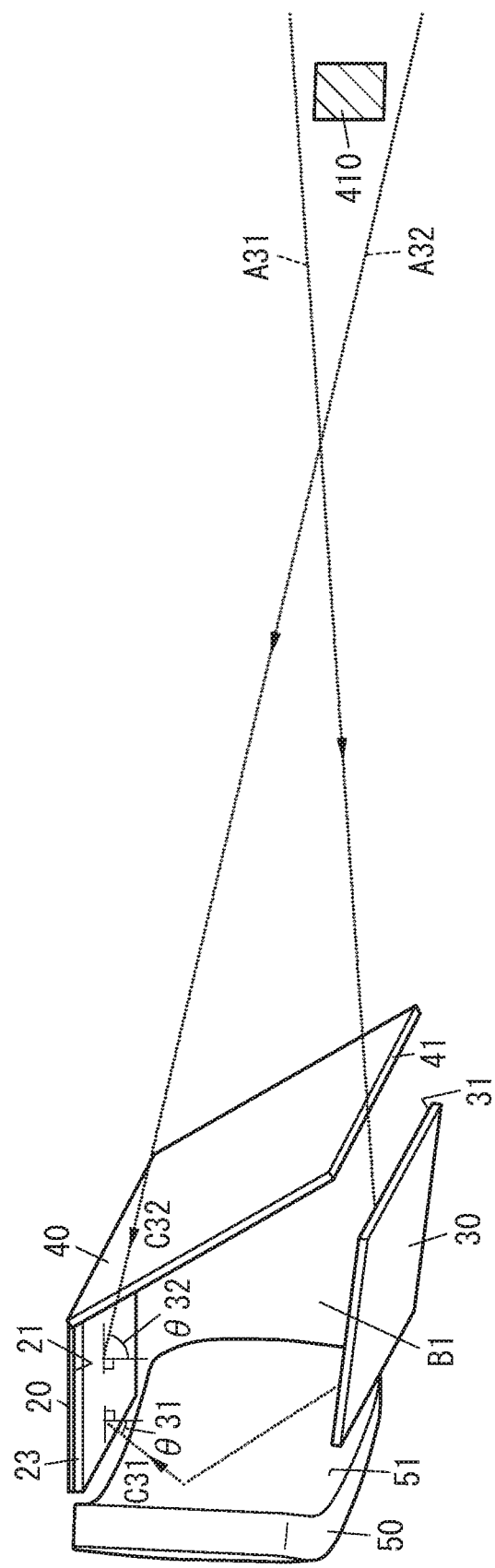
FIG. 14 schematically illustrates a display system according to a fifth variation of the exemplary embodiment of the present disclosure.

A display system 10 according to a fifth variation further includes a light control member 23 arranged on the display screen 21 of the display device 20 to control the angle of emergence of the light beam from the display device 20 as shown in FIG. 14. Other than the light control member 23, the display system 10 according to the fifth variation has the same configuration as the exemplary embodiment described above. Thus, in the following description, any constituent element of this fifth variation, having the same function as a counterpart of the exemplary embodiment described above, will be designated by the same reference numeral as that counterpart's, and a detailed description thereof will be omitted herein.

The light control member 23 limits the angle of emergence of the light beam from the display device 20 to a predetermined permissible angle range. That is to say, the light control member 23 controls the angle of emergence to prevent the light beam from emerging at an angle of emergence falling outside of the permissible angle range.

In FIG. 14, the line of sight of the user 400 who is looking into the second reflective mirror 40 of the display system 10 from over his or her eye box 410 is indicated by the dotted line A31. As used herein, the eye box 410 refers to a range in which the edges of the second image as a virtual image become invisible when the user 400 shifts his or her viewpoint. In this variation, the light beam that has come along the line of sight indicated by the dotted line A31 is reflected from the first reflective mirror 30 and the last reflective mirror 50 and then incident on the display device 20. The permissible angle range of the light control member 23 is set such that the angle of incidence θ31 of the incoming light beam C31 on the surface of the light control member 23 falls outside of the permissible angle range in which the light control member 23 limits the angle of emergence. Thus, when the user 400 is looking into the second reflective mirror 40 of the display system 10 from over the eye box 410, the image produced on the display screen 21 of the display device 20 and then reflected from the first reflective mirror 30 and last reflective mirror 50 becomes less easily viewable.

Also, in FIG. 14, the line of sight of the user 400 who is looking into the second reflective mirror 40 of the display system 10 from under his or her eye box 410 is indicated by the dotted line A32. In this variation, the permissible angle range of the light control member 23 is set such that the angle of incidence θ32 of the light beam C32 incident on the surface of the light control member 23 along the line of sight indicated by the dotted line A32 falls outside of the permissible angle range in which the light control member 23 limits the angle of emergence. Thus, when the user 400 is looking into the second reflective mirror 40 of the display system 10 from under the eye box 410, the display screen 21 of the display device 20 becomes invisible directly.

(3.6) Sixth Variation

In the exemplary embodiment and first and second variations described above, the second optical member with the second reflective surface 41, 601 has a light-transmitting property. However, this is only an example and should not be construed as limiting. Alternatively, the first optical member with the first reflective surface 31 (the first reflective mirror 30) may have a light-transmitting property. That is to say, at least one of the first optical member with the first reflective surface 31 or the second optical member with the second reflective surface 41, 601 may have a light-transmitting property that allows the optical member to transmit the incoming light beam partially. The light beam reflected from the last reflective surface 51 is transmitted through a light transmissible one of the first and second optical members before going out of the display system 10.

Figure 15:
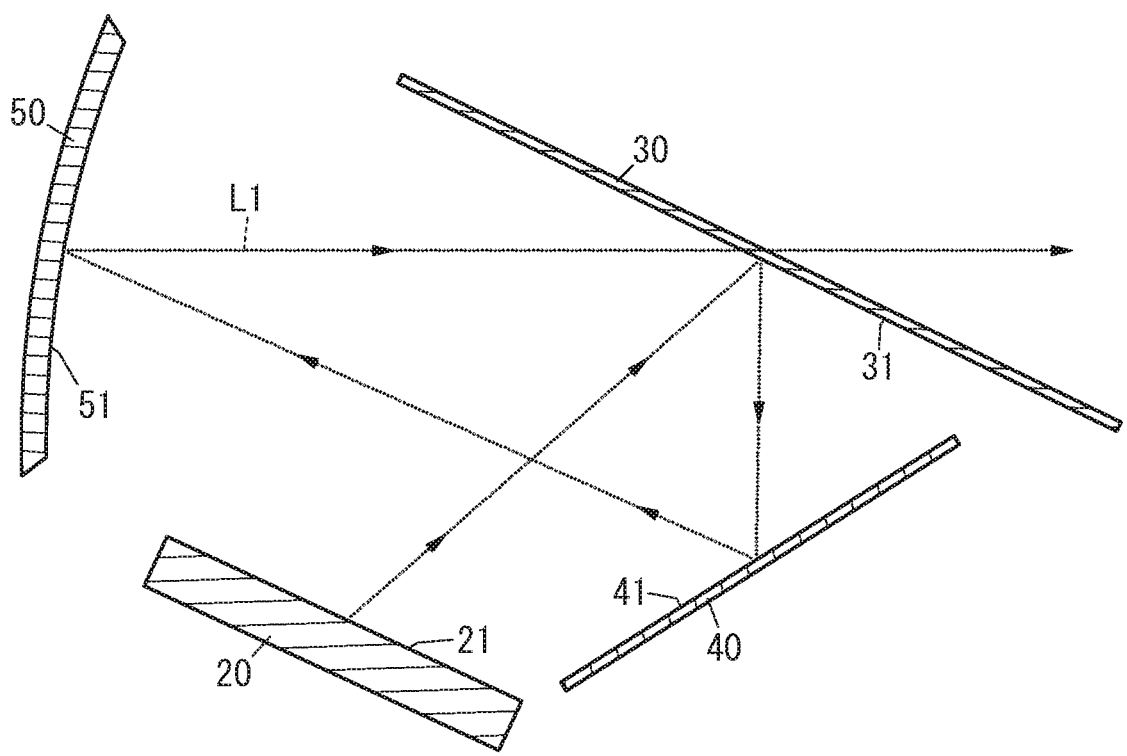
FIG. 15 schematically illustrates a display system according to a sixth variation of the exemplary embodiment of the present disclosure.

Furthermore, when the last reflective surface 51 reflects a light beam toward the first reflective surface 31, the first reflective mirror 30 with the first reflective surface 31 may have a light transmitting property, and part of the light beam reflected from the last reflective surface 51 is transmitted through the first reflective mirror 30 before going out of the display system 10 as shown in FIG. 15. In the display system 10 shown in FIG. 15, the optical paths A11 and A13 also intersect with each other. This decreases the interval between the first reflective surface 31 and the last reflective surface 51, thus cutting down the overall size of the display system 10, compared to a situation where the optical paths A11 and A13 do not intersect with each other.

In this variation, out of the first reflective surface 31 and the second reflective surface 41, the first reflective surface 31 with a light-transmitting property may be configured as, for example, the surface of a beam splitter. The light beam reflected from the last reflective surface 51 is transmitted through the first reflective mirror 30 configured as a beam splitter to go out of the display system 10. In this case, the second reflective mirror 40 with the second reflective surface 41 may or may not have a light-transmitting property.

Optionally, in the display system 10 shown in FIG. 15, the first reflective mirror 30 with a light-transmitting property may be configured as a polarizer and the first reflective surface 31 of the first reflective mirror 30 may be configured as the surface of the polarizer as in the first variation. In that case, an optical element which is a retardation plate to produce a phase difference of a quarter wavelength in the electric field direction of the incoming light is provided for each of the surface of the polarizer and the surface of the display screen 21 of the display device 20. This allows the optical element provided on the display screen 21 of the display device 20 and the optical element provided on the surface of the polarizer to convert the polarization state of the incoming light beam. Thus, this display system 10 allows the light beam emerging from the display screen 21 of the display device 20 to be reflected from the first reflective surface 31 and also allows the light beam reflected from the last reflective surface 51 to be transmitted through the first reflective mirror 30 with the first reflective surface 31 and go out of the display system 10.

(3.7) Other Variations

In the exemplary embodiment described above, the reflection optical system for reflecting the light beam emerging from the display device 20 includes the first reflective surface 31, the second reflective surface 41, and the last reflective surface 51. However, the display device 20, the first reflective surface 31, the second reflective surface 41, and the last reflective surface 51 do not have to be arranged as in the exemplary embodiment described above. Alternatively, the display device 20 may also be arranged in an upper part of the chamber 73 with its display screen 21 facing down, and the first reflective mirror 30 may be arranged in a lower part of the chamber 73 with the first reflective surface 31 thereof facing up. Furthermore, in the display system 10 described above, the light beam emerging from the display device 20 goes through the first reflective surface 31 and the second reflective surface 41 before reaching the last reflective surface 51. However, this is only an example and should not be construed as limiting. Alternatively, the display system 10 may further include one or more reflective surfaces in addition to the first reflective surface 31 and the second reflective surface 41.

In the display system 10 according to the exemplary embodiment described above, the last reflective surface 51 is arranged such that the light beam incident thereon along the optical paths A13 and A23 has an angle of reflection of 0 degrees. However, the light beam that has come along the optical paths A13 and A23 does not have to have an angle of reflection of 0 degrees but the angle of reflection may be changed appropriately according to the optical path design.

In the display system 10 according to the exemplary embodiment and first and second variations described above, the light beam reflected from the last reflective surface 51 may go out of the display system 10 by being transmitted through another light-transmitting member (such as a light-transmitting cover provided for the housing 70), instead of the first reflective mirror 30 and the second reflective mirror 40.

Furthermore, in the display system 10 according to the exemplary embodiment described above, each of the first reflective surface 31 and the second reflective surface 41 is a flat surface. However, this is only an example and should not be construed as limiting. Alternatively, the first reflective surface 31 and the second reflective surface 41 may be at least partially curved. The surface of the first reflective surface 31 and the second reflective surface 41 may be designed such that curving the first reflective surface 31 and the second reflective surface 41 at least partially reduces the distortion of the image and increases the resolution thereof.

Figure 16:
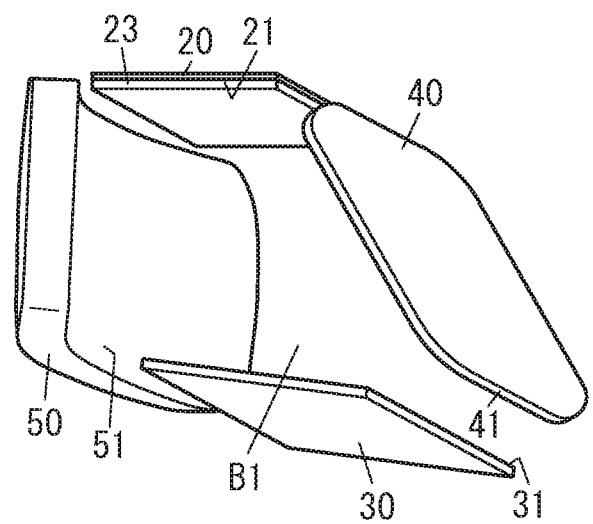
FIG. 16 schematically illustrates a display system according to another variation of the exemplary embodiment of the present disclosure.

Furthermore, in the display system 10 according to the exemplary embodiment and variations (except the sixth variation) described above, the second reflective surface 41 is the surface of a light-transmitting optical member (second reflective mirror 40) with a light transmitting property that transmits the incoming light beam partially, and the light beam reflected from the last reflective surface 51 is transmitted through the second reflective surface 40 to go out of the display system 10. In this case, the longitudinal dimension of the display device 20 is suitably smaller than the longitudinal dimension of the second reflective surface 41 of the second reflective mirror 40 as the second optical member or that of the last reflective surface 51 of the last reflective mirror 50 as the last optical member. Likewise, the longitudinal dimension of the first reflective surface 31 of the first reflective mirror 30 as the first optical member is suitably smaller than the longitudinal dimension of the second reflective surface 41 of the second reflective mirror 40 as the second optical member or that of the last reflective surface 51 of the last reflective mirror 50 as the last optical member. As used herein, the "longitudinal direction" corresponds to the length of the second image 300 displayed by the display system 10 and is the direction in which the right and left eyes of the user who is viewing the second image 300 are arranged side by side. When the display system 10 is applied to an electronic mirror system 80 for an automobile 100, the longitudinal direction corresponds to the width of the automobile 100. Specifically, the longitudinal dimension of the display device 20 is approximately 70% of that of the last reflective surface 51, and the longitudinal dimension of the first reflective surface 31 is approximately 80% of that of the last reflective surface 51. Also, the longitudinal dimension of the second reflective surface 41 is approximately equal to that of the last reflective surface 51. As used herein, if one value is "equal to" another value, then these two values may naturally be exactly equal to each other but may also be roughly equal to each other within a tolerance of at most a few percent (e.g., approximately 1%). That is to say, the longitudinal dimensions of the second reflective surface 41 and the last reflective surface 51 may naturally be exactly equal to each other but may also be different from each other by a tolerance of at most a few percent (e.g., one percent). Even so, the longitudinal dimension of the second reflective surface 41 is suitably larger than that of the last reflective surface 51 within the tolerance specified above. This allows the four corners of the second reflective mirror 40 and the last reflective mirror 50 to be rounded as shown in FIG. 16. Consequently, when viewed from the front of the display system 10 mounted on the automobile 100, the housing 70 may have four rounded corners as shown in FIG. 3, and therefore, have a reduced overall size. In addition, rounding the four corners of the housing 70 reduces the feeling of oppression on the user when the display system 10 is viewed from a person seated on the assistant driver's seat.

Note that the longitudinal dimension of the display device 20 is suitably less than that of the first reflective surface 31 and the longitudinal dimension of the second reflective surface 41 is suitably equal to that of the last reflective surface 51. This allows the four corners of the second reflective mirror 40 and the four corners of the last reflective mirror 50 to be further rounded, thus contributing to more significant size reduction.

In the display system 10 according to the exemplary embodiment and variations described above, the display device 20 is implemented as a liquid crystal display including a liquid crystal panel and a light source. However, this is only an example and should not be construed as limiting. Alternatively, the display device 20 may also be implemented as a self-emitting display panel including organic light-emitting diodes (OLEDs), for example. Still alternatively, the display device 20 may also be configured to render an image on a diffusion-transmission type screen by scanning the screen with a laser beam radiated from behind the screen. Yet alternatively, the display device 20 may also be configured to project an image onto a diffusion-transmission type screen from a projector arranged behind the screen.

Furthermore, in the exemplary embodiment and variations described above, the display system 10 is applied to the electronic mirror system 80. However, this is only an example and should not be construed as limiting. Alternatively, the display system 10 is also applicable to a head-up display (HUD) for use in an automobile 100 as an exemplary moving vehicle. Specifically, in a head-up display including the display system 10, the display system 10 projects an image onto the windshield 102 (reflective member) of the automobile 100 from under the windshield 102 and the image reflected from the windshield 102 is viewed by the user 400 (driver). Such a head-up display allows the user 400 to recognize the image as if the image (virtual image) were projected onto a space in front (and outside) of the automobile 100.

The display system 10 according to the exemplary embodiment and variations described above is configured to capture and display an image representing a rear view for the driver of the automobile 100. However, this is only an example and should not be construed as limiting. Alternatively, the display system 10 may also display an image based on a captured image representing a rear side view, a side view, or a front view for the driver of the automobile 100.

In the exemplary embodiment and variations described above, the electronic mirror system 80 including the display system 10 is applied to the automobile 100. However, this is only an example and should not be construed as limiting. The electronic mirror system 80 is also applicable to motorcycles, bicycles, railway trains, aircrafts, construction machines, ships, boats, and various types of moving vehicles other than automobiles 100.

The display system 10 does not have to be implemented as a single device but may be distributed in multiple devices as well. That is to say, the respective functions of the display system 10 may be performed dispersedly by two or more devices. For example, the functions of the display controller 22 may be performed separately by an electronic control unit (ECU) of the automobile 100 and by a server device provided outside of the automobile 100. In that case, the image to be displayed on the display device 20 is produced by either the ECU or the server device.

(Resume)

As can be seen from the foregoing description, a display system (10) according to a first aspect is configured to display, based on a first image produced on a display device (20), a second image thereon. The display system (10) includes at least a first reflective surface (31) and a second reflective surface (41, 601) on an optical path (A11, A21, A13, A23) leading from the display device (20) to a last reflective surface (51). The last reflective surface (51) is configured to reflect a light beam emerging from the display device (20) toward a space outside of the display system (10). The first reflective surface (31) is configured to reflect the light beam emerging from the display device (20) toward the second reflective surface (41, 601). The second reflective surface (41, 601) is configured to reflect, toward the last reflective surface (51), the light beam reflected from the first reflective surface (31). The light beam emerging from the display device (20) travels along a first optical path (A11, A21) and then a second optical path (A13, A23). The first optical path (A11, A21) leads from a display screen (21) of the display device (20) to the first reflective surface (31). The second optical path (A13, A23) leads from the second reflective surface (41, 601) to the last reflective surface (51). The first optical path (A11, A21) and the second optical path (A13, A23) intersect with each other before the light beam impinges on the last reflective surface (51).

This aspect makes the first optical path (A11, A21) intersect with the second optical path (A13, A23), thus reducing the overall size of the display system (10) compared to a situation where the first optical path (A11, A21) and the second optical path (A13, A23) do not intersect with each other.

A display system (10) according to a second aspect is configured to display, based on a first image produced on a display device (20), a second image thereon. The display system (10) includes the display device (20), a first optical member (30), a second optical member (40), and a last optical member (50). The first optical member (30) is arranged to face the display device (20) and has a first reflective surface (31) configured to reflect a first incoming light beam that has come in a first direction from a display screen (21) of the display device (20) toward a second direction different from, and not parallel to, the first direction. The second optical member (40) is arranged to face the first reflective surface (31) and has a second reflective surface (41, 601) configured to reflect a second incoming light beam that has come in the second direction from the first reflective surface (31) toward a third direction different from the second direction. The last optical member (50) is arranged to face the second reflective surface (41, 601) and has a last reflective surface (51) configured to reflect a third incoming light beam that has come in the third direction from the second reflective surface (41, 601). An optical path (A11, A21) of the first incoming light beam intersects with an optical path (A13, A23) of the third incoming light beam.

This aspect makes the optical path (A11, A21) intersect with the optical path (A13, A23), thus reducing the overall size of the display system (10) compared to a situation where the optical path (A11, A21) and the optical path (A13, A23) do not intersect with each other.

In a display system (10) according to a third aspect, which may be implemented in conjunction with the first aspect, the light beam traveling along the first optical path (A11, A21) emerges obliquely to a normal to the display screen (21).

This aspect contributes to reducing the overall size of the display system (10).

In a display system (10) according to a fourth aspect, which may be implemented in conjunction with the third aspect, the last reflective surface (51) is configured to reflect the light beam toward a direction different from, and not parallel to, an incoming direction in which the light beam has come from the second reflective surface (41, 601).

This aspect reduces the trapezoidal distortion of the second image.

In a display system (10) according to a fifth aspect, which may be implemented in conjunction with the second aspect, the first incoming light beam emerges obliquely to a normal to the display screen (21). The last reflective surface (51) is configured to reflect the third incoming light beam toward a fourth direction different from, and not parallel to, the third direction in which the third incoming light beam has come from the second reflective surface (41, 601).

This aspect contributes to reducing the overall size of the display system (10) and reducing the trapezoidal distortion of the second image.

In a display system (10) according to a sixth aspect, which may be implemented in conjunction with any one of the first to fifth aspects, at least one of the first reflective surface (31) or the second reflective surface (41, 601) is a surface of a light-transmitting optical member (30, 40) having a light-transmitting property that causes the surface to transmit an incoming light beam partially. The light beam reflected from the last reflective surface (51) is transmitted through the light-transmitting optical member (30, 40) to leave the display system (10).

This aspect contributes to reducing the overall size of the display system (10).

In a display system (10) according to a seventh aspect, which may be implemented in conjunction with the sixth aspect, the light-transmitting optical member (30, 40) includes a beam splitter.

This aspect allows the beam splitter to perform both the function of reflecting the incoming light beam and the function of letting the light beam reflected from the last reflective surface (51) leave the display system (10).

In a display system (10) according to an eighth aspect, which may be implemented in conjunction with the sixth aspect, the light-transmitting optical member (30, 40) includes a substrate (40A) and a polarizer (60). The display system (10) further includes optical elements (61, 62), each configured to produce a phase difference of a quarter wavelength in an electric field direction of the incoming light beam. The optical elements (61, 62) are provided on the display screen (21) and on a surface of the polarizer (60), respectively.

This aspect not only allows the polarizer (60) to perform both the function of reflecting the incoming light beam and the function of letting the light beam reflected from the last reflective surface (51) leave the display system (10) but also cuts down the loss of light. In addition, this aspect also allows the optical elements (61, 62) to produce a phase difference in the incoming light beam impinging on the surface of the polarizer (60). This allows the polarizer (60) to reflect the incoming light beam that has come from either the display device (20) or the first reflective surface (31) and to transmit the light beam reflected from the last reflective surface (51).

In a display system (10) according to a ninth aspect, which may be implemented in conjunction with the eighth aspect, the light-transmitting optical member (40) further includes a counter substrate (40B) with a light-transmitting property. The polarizer (60) and the optical element (62) provided on the surface of the polarizer (60) are sandwiched between the substrate (40A) and the counter substrate (40B).

This aspect has the polarizer (60) and the optical element (62) sandwiched between the two substrates (40A, 40B), thus reducing a dispersion in the thickness of the optical element (62) itself, a dispersion in thickness between the substrate (40A) and the polarizer (60), and a dispersion in thickness between the polarizer (60) and the optical element (62). This reduces fine waving of the respective interfaces between the polarizer (60), the optical element (62), and the two substrates (40A, 40B) and thereby reduces degradation in the quality of the reflected image.

A display system (10) according to a tenth aspect, which may be implemented in conjunction with the eighth aspect, further includes a phase control member (63). The phase control member (63) produces a phase difference of a quarter wavelength in the electric field direction of the incoming light beam. The optical element (62) is arranged on a surface (601), on which the light beam that has come from the display device (20) is incident, of the polarizer (60). The phase control member (63) is arranged on surface, facing outside of the display system (10), of the light-transmitting optical member (40).

This aspect allows the light traveling from inside of the display system (10) to outside of the display system (10) via the phase control member (63) to be converted from a linearly polarized light beam into a circularly polarized light beam. This reduces, even when the user (400) is wearing a pair of polarization glasses, the chances of the second image displayed by the display system (10) looking dark.

A display system (10) according to an eleventh aspect, which may be implemented in conjunction with any one of the sixth to tenth aspects, further includes a reflected glare reducer configured to reduce a reflected glare caused by an externally incoming light beam on an inner surface of the light-transmitting optical member (which corresponds to the first reflective mirror 30 according to the configuration shown in FIG. 14 but corresponds to the second reflective mirror 40 otherwise). The externally incoming light beam comes from outside of the display system (10).

This aspect increases the contrast ratio of the second image displayed by the display system (10) to the reflected glare.

In a display system (10) according to a twelfth aspect, which may be implemented in conjunction with the eleventh aspect, the reflected glare reducer includes the light-transmitting optical member (30, 40) arranged such that the inner surface thereof intersects obliquely with a direction in which the light beam reflected from the last reflective surface (51) travels.

This aspect provides a reflected glare reducer that reduces the glare highly accurately and uniformly, thus further increasing the contrast ratio of the second image displayed by the display system (10) to the reflected glare.

In a display system (10) according to a thirteenth aspect, which may be implemented in conjunction with the eleventh or twelfth aspect, the reflected glare reducer includes a reflection reducing member (75) arranged in a direction in which the externally incoming light beam is reflected from the inner surface. The externally incoming light beam has been incident on the inner surface from outside of the display system (10). A direction in which the externally incoming light beam has come is antiparallel to a direction in which the light beam reflected from the last reflective surface (51) travels. The reflection reducing member (75) faces the light-transmitting optical member (30, 40). The reflection reducing member (75) is configured to absorb and/or scatter the incoming light beam.

This aspect allows the externally incoming light beam reflected from the inner surface to be either absorbed or scattered, thus further increasing the contrast ratio of the second image displayed by the display system (10) to the reflected glare.

In a display system (10) according to a fourteenth aspect, which may be implemented in conjunction with any one of the first to thirteenth aspects, each of the first reflective surface (31) and the second reflective surface (41, 601) is an at least partially curved surface.

This aspect allows the distortion of the image to be corrected.

A display system (10) according to a fifteenth aspect, which may be implemented in conjunction with any one of the first to fourteenth aspects, further includes a light control member (23) arranged on the display screen (21) of the display device (20) and configured to control an angle of emergence of the light beam emerging from the display device (20).

This aspect allows the second image displayed by the display system (10) to be viewed only in a limited angular range.

In a display system (10) according to a sixteenth aspect, which may be implemented in conjunction with any one of the first to fifteenth aspects, the second image (300) is based on a partial image (P11) that forms part of the first image (P1).

This aspect allows the range in which the second image is viewable to vary according to the viewpoint of the user (400).

In a display system (10) according to a seventeenth aspect, which may be implemented in conjunction with the first or second aspect, the second reflective surface (41, 601) is a surface of a light-transmitting optical member (40) having a light-transmitting property that causes the surface to transmit an incoming light beam partially. The light beam reflected from the last reflective surface (51) is transmitted through the light-transmitting optical member (40) into a space outside of the display system (10). A longitudinal dimension of the display device (20) is smaller than each of a longitudinal dimension of the second reflective surface (41, 601) and a longitudinal dimension of the last reflective surface (51). A longitudinal dimension of the first reflective surface (31) is smaller than each of the longitudinal dimension of the second reflective surface (41, 601) and the longitudinal dimension of the last reflective surface (51).

This aspect allows for rounding the four corners of the light-transmitting optical member (40) with the second reflective surface (41, 601) and the last optical member (50) with the last reflective surface (51), thus contributing to reducing the overall size of the display system (10).

In a display system (10) according to an eighteenth aspect, which may be implemented in conjunction with the seventeenth aspect, the longitudinal dimension of the display device (20) is smaller than the longitudinal dimension of the first reflective surface (31), and the longitudinal dimension of the second reflective surface (41, 601) is equal to the longitudinal dimension of the last reflective surface (51).

This aspect allows such rounded portions at the four corners of the light-transmitting optical member (40) with the second reflective surface (41, 601) and the last optical member (50) with the last reflective surface (51) to be provided at even inner locations, thus further contributing to reducing the overall size of the display system (10).

An electronic mirror system (80) according to a nineteenth aspect includes: the display system (10) according to any one of the first to eighteenth aspects; and an image capture device (90). The display device (20) is configured to display the first image based on an image captured by the image capture device (90).

This aspect provides an electronic mirror system (80) including a display system (10) that may have a reduced overall size.

A moving vehicle (100) according to a twentieth aspect includes: the electronic mirror system (80) according to the nineteenth aspect and a moving vehicle body (110) equipped with the electronic mirror system (80).

This aspect provides a moving vehicle (100) including a display system (10) that may have a reduced overall size.

In a display system (10) according to a twenty-first aspect, which may be implemented in conjunction with any one of the first to eighteenth aspects, the display screen (21) of the display device (20) and the first reflective surface (31) face each other while interposing, between themselves, a range (200) in which the light beam emerging from the display device (20) travels to reach the last reflective surface (51). As used herein, if two surfaces face each other with the range (200) interposed between themselves, the two surfaces may be arranged parallel to each other and may also be not parallel to each other and face each other with the range (200) interposed between themselves.

This aspect provides a display system (10) that may have a reduced overall size.

In a display system (10) according to a twenty-second aspect, which may be implemented in conjunction with any one of the first to eighteenth and twenty-first aspects, the second reflective surface (41, 601) and the last reflective surface (51) face each other with the range (200) interposed between themselves.

This aspect provides a display system (10) that may have a reduced overall size.

In a display system (10) according to a twenty-third aspect, which may be implemented in conjunction with any one of the first to eighteenth, twenty-first, and twenty-second aspects, the optical path (A13, A23) along which the light beam travels from the second reflective surface (41, 601) to the last reflective surface (51) is parallel to the optical path (A14, A24) along which the light beam travels from the last reflective surface (51) to the second reflective surface (41, 601).

This aspect provides a display system (10) that may have a reduced overall size.

Note that the constituent elements according to the third to eighteenth aspects and the twenty-first to twenty-third aspects are not essential elements of the display system (10) but may be omitted as appropriate.

While various embodiments have been described herein above, it is to be appreciated that various changes in form and detail may be made without departing from the spirit and scope of the present disclosure presently or hereafter claimed.

In this application, the entire contents of Japanese Patent Applications Nos. 2018-162122 and 2019-73828 mentioned above are hereby incorporated by reference for all purposes.

The invention claimed is:

1. A display system configured to display, based on a first image produced on a display device, a second image thereon,
   the display system comprising at least a first reflective surface and a second reflective surface on an optical path leading from the display device to a last reflective surface, the last reflective surface being configured to reflect a light beam emerging from the display device toward a space outside of the display system,
   the second reflective surface being a surface of a light-transmitting optical member having a light-transmitting property that causes the surface of the optical member to transmit an incoming light beam partially,
   the first reflective surface being configured to reflect the light beam emerging from the display device toward the second reflective surface,
   the second reflective surface being configured to reflect, toward the last reflective surface, the light beam reflected from the first reflective surface,
   the light beam reflected from the last reflective surface being transmitted through the light-transmitting optical member to leave the display system,
   the light beam emerging from the display device traveling along a first optical path and a second optical path, the first optical path leading from a display screen of the display device to the first reflective surface, the second optical path leading from the second reflective surface to the last reflective surface, the first optical path and the second optical path intersecting with each other before the light beam impinges on the last reflective surface,
   the light-transmitting optical member including a substrate and a polarizer, and
   the display system further comprising optical elements, each being configured to produce a phase difference which is different from a wavelength of the incoming light beam in an electric field direction of the incoming light beam, the optical elements being provided on the display screen and on a surface of the polarizer, respectively.

2. The display system of claim 1, wherein
   the light beam traveling along the first optical path emerges obliquely to a normal to the display screen.

3. The display system of claim 2, wherein
the last reflective surface is configured to reflect the light beam toward a direction different from, and not parallel to, an incoming direction in which the light beam has come from the second reflective surface.

4. The display system of claim 3, further comprising a reflected glare reducer configured to reduce a reflected glare caused by an externally incoming light beam on an inner surface of the light-transmitting optical member, the externally incoming light beam coming from outside of the display system, wherein
the reflected glare reducer includes the light-transmitting optical member arranged such that the inner surface thereof intersects obliquely with a direction in which the light beam reflected from the last reflective surface travels.

5. The display system of claim 3, further comprising a reflected glare reducer configured to reduce a reflected glare caused by an externally incoming light beam on an inner surface of the light-transmitting optical member, the externally incoming light beam coming from outside of the display system, wherein
the reflected glare reducer includes a reflection reducing member arranged in a direction in which the externally incoming light beam is reflected from the inner surface,
the externally incoming light beam having been incident on the inner surface from outside of the display system,
a direction in which the externally incoming light beam has come being antiparallel to a direction in which the light beam reflected from the last reflective surface travels,
the reflection reducing member facing the light-transmitting optical member, and
the reflection reducing member is configured to absorb or scatter the incoming light beam.

6. The display system of claim 1, wherein
the light beam from the display screen of the display device travels to the first reflective surface without transmitting through the light-transmitting optical member.

7. The display system of claim 1, wherein
the light-transmitting optical member includes a beam splitter.

8. The display system of claim 7, wherein
the light-transmitting optical member further includes a counter substrate with a light-transmitting property, the polarizer and the optical element provided on the polarizer being sandwiched between the substrate and the counter substrate.

9. The display system of claim 7, wherein
the optical element is arranged on a surface, on which the light beam that has come from the display device is incident, of the polarizer, and
the phase control member is arranged on surface, facing outside of the display system, of the light-transmitting optical member,
the phase control member is configured to produce a phase difference of a quarter wavelength in the electric field direction of the incoming light beam.

10. The display system of claim 1, wherein
each of the first reflective surface and the second reflective surface is an at least partially curved surface.

11. The display system of claim 1, further comprising a light control member arranged on the display screen of the display device and configured to limit an angle of emergence of the light beam emerging from the display device to a predetermined permissible angle range.

12. The display system of claim 1, wherein
the second image is based on a partial image that forms part of the first image.

13. The display system of claim 1, wherein
a longitudinal dimension of the display device is smaller than each of a longitudinal dimension of the second reflective surface and a longitudinal dimension of the last reflective surface,
a longitudinal dimension of the first reflective surface is smaller than each of the longitudinal dimension of the second reflective surface and the longitudinal dimension of the last reflective surface, and
the longitudinal dimension of the first reflective surface is longer than the longitudinal dimension of the display device.

14. The display system of claim 13, wherein
the longitudinal dimension of the display device is smaller than the longitudinal dimension of the first reflective surface, and the longitudinal dimension of the second reflective surface is equal to the longitudinal dimension of the last reflective surface.

15. An electronic mirror system comprising:
the display system of claim 1; and
an image capture device,
the display device being configured to display the first image based on an image captured by the image capture device.

16. A moving vehicle comprising:
the electronic mirror system of claim 15; and
a moving vehicle body equipped with the electronic mirror system.

17. A display system configured to display, based on a first image produced on a display device, a second image thereon, the display system comprising:
the display device;
a first optical member arranged to face the display device and having a first reflective surface configured to reflect a first incoming light beam that has come in a first direction from a display screen of the display device toward a second direction different from, and not parallel to, the first direction;
a second optical member arranged to face the first reflective surface and having a second reflective surface configured to reflect a second incoming light beam that has come in the second direction from the first reflective surface toward a third direction different from the second direction; and
a last optical member arranged to face the second reflective surface and having a last reflective surface configured to reflect a third incoming light beam that has come in the third direction from the second reflective surface,
the second optical member including a light-transmitting optical member having a light-transmitting property that causes the surface to transmit an incoming light beam partially,
the light beam reflected from the last reflective surface being transmitted through the second optical member to leave the display system,
an optical path of the first incoming light beam intersecting with an optical path of the third incoming light beam,
the light-transmitting optical member including a substrate and a polarizer, and
the display system further comprising optical elements, each being configured to produce a phase difference which is different from a wavelength of the incoming light beam in an electric field direction of the incoming light beam, the optical elements being provided on the display screen and on a surface of the polarizer, respectively.

18. The display system of claim 17, wherein
the first incoming light beam emerges obliquely to a normal to the display screen, and
the last reflective surface is configured to reflect the third incoming light beam toward a fourth direction different from, and not parallel to, the third direction in which the third incoming light beam has come from the second reflective surface.

* * * * *